(12) United States Patent
Olderdissen et al.

(10) Patent No.: US 11,144,306 B2
(45) Date of Patent: *Oct. 12, 2021

(54) SCHEDULING UPGRADES IN DISTRIBUTED COMPUTING SYSTEMS

(71) Applicant: Nutanix, Inc., San Jose, CA (US)

(72) Inventors: Jan Olderdissen, Herrenberg (DE); Manoj Sudheendra, San Jose, CA (US); Nikhil Bhatia, San Jose, CA (US); Viswanathan Vaidyanathan, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,512

(22) Filed: May 1, 2020

(65) Prior Publication Data
US 2020/0278859 A1 Sep. 3, 2020

Related U.S. Application Data

(63) Continuation of application No. 15/872,792, filed on Jan. 16, 2018, now Pat. No. 10,642,603.

(51) Int. Cl.
*G06F 9/44* (2018.01)
*G06F 8/656* (2018.01)
(Continued)

(52) U.S. Cl.
CPC ............ *G06F 8/656* (2018.02); *G06F 8/63* (2013.01); *G06F 8/654* (2018.02);
(Continued)

(58) Field of Classification Search
CPC . G06F 8/63; G06F 8/654; G06F 8/656; G06F 9/45558; G06F 2009/4557; G06F 2009/45579
(Continued)

(56) References Cited

U.S. PATENT DOCUMENTS 7,299,463 B2 11/2007 Brannock et al.
7,444,386 B2 10/2008 Jensen et al.
(Continued)

OTHER PUBLICATIONS

Dell EMC Isilon, "OneFS 7.x Upgrade Planning and Process Guide", 2017, Dell Inc., 90 pages. (Year: 2017).*
(Continued)

*Primary Examiner* — Ted T. Vo
(74) *Attorney, Agent, or Firm* — Dorsey & Whitney LLP

(57) ABSTRACT

Examples of systems described herein may include virtualized computing environments having one or more upgrade management agents. An upgrade management agent may detect current versions of multiple components in a computing system, including at least one software component and at least one firmware component, obtain a group of updates based on the current versions of the multiple components, and schedule installation of the group of updates including grouping together installation of selected ones of the group of updates for a particular computing node of the computing system, wherein the selected ones each utilize a particular state change of the computing node during the installation. The schedule may also be selected to accommodate dependencies between multiple components which are resolved by the upgrade management agent to obtain the schedule.

34 Claims, 18 Drawing Sheets

(51) Int. Cl.
*G06F 9/455* (2018.01)
*G06F 8/61* (2018.01)
*G06F 8/654* (2018.01)

(52) U.S. Cl.
CPC .. *G06F 9/45558* (2013.01); *G06F 2009/4557* (2013.01); *G06F 2009/45579* (2013.01)

(58) Field of Classification Search
USPC .................................................. 717/168–178
See application file for complete search history.

(56) References Cited

U.S. PATENT DOCUMENTS

| | | | |
|---|---|---|---|
| 8,549,518 | B1 | 10/2013 | Aron et al. |
| 8,601,473 | B1 | 12/2013 | Aron et al. |
| 8,683,206 | B2 | 3/2014 | Sarkar et al. |
| 8,789,035 | B2 | 7/2014 | Mccarthy et al. |
| 8,850,130 | B1 | 9/2014 | Aron et al. |
| 8,863,124 | B1 | 10/2014 | Aron |
| 9,009,106 | B1 | 4/2015 | Aron et al. |
| 9,069,708 | B2 | 6/2015 | Gill et al. |
| 9,223,563 | B2 | 12/2015 | Stenfort et al. |
| 9,235,404 | B2 | 1/2016 | Cavalaris et al. |
| 9,336,132 | B1 | 5/2016 | Aron et al. |
| 9,367,195 | B1 | 6/2016 | Rabe et al. |
| 9,449,008 | B1 | 9/2016 | Oikarinen et al. |
| 9,471,784 | B1 | 10/2016 | Marr et al. |
| 9,565,207 | B1 | 2/2017 | Marr et al. |
| 9,652,265 | B1 | 5/2017 | Narayanasamy et al. |
| 9,747,287 | B1 | 8/2017 | Bhardwaj et al. |
| 9,772,866 | B1 | 9/2017 | Aron et al. |
| 10,467,163 | B1 | 11/2019 | Malwankar et al. |
| 10,642,603 | B2 * | 5/2020 | Olderdissen ............ G06F 8/656 |
| 10,838,754 | B2 | 11/2020 | Boggarapu et al. |
| 2003/0066062 | A1 | 4/2003 | Brannock et al. |
| 2003/0070001 | A1 | 4/2003 | Belknap et al. |
| 2003/0217358 | A1 | 11/2003 | Thurston et al. |
| 2004/0034861 | A1 | 2/2004 | Ballai |
| 2004/0225775 | A1 | 11/2004 | Pellegrino et al. |
| 2004/0230963 | A1 | 11/2004 | Rothman et al. |
| 2004/0261086 | A1 | 12/2004 | Jensen et al. |
| 2006/0048001 | A1 | 3/2006 | Honda et al. |
| 2006/0129972 | A1 | 6/2006 | Tyburski et al. |
| 2006/0179294 | A1 | 8/2006 | Chu et al. |
| 2008/0089682 | A1 | 4/2008 | Sylvester et al. |
| 2008/0244553 | A1 | 10/2008 | Cromer et al. |
| 2009/0172252 | A1 | 7/2009 | Tomlin et al. |
| 2009/0326909 | A1 | 12/2009 | Flack et al. |
| 2010/0202450 | A1 | 8/2010 | Ansari et al. |
| 2010/0262749 | A1 | 10/2010 | Frydman et al. |
| 2011/0219359 | A1 | 9/2011 | Gupta |
| 2011/0231864 | A1 | 9/2011 | Raj et al. |
| 2012/0124572 | A1 | 5/2012 | Cunningham et al. |
| 2012/0166693 | A1 | 6/2012 | Weinstock et al. |
| 2012/0179932 | A1 | 7/2012 | Armstrong et al. |
| 2012/0204142 | A1 | 8/2012 | Rubenstein et al. |
| 2012/0246632 | A1 | 9/2012 | Lupu et al. |
| 2012/0311548 | A1 | 12/2012 | Ko et al. |
| 2013/0055259 | A1 | 2/2013 | Dong |
| 2013/0074061 | A1 | 3/2013 | Averbuch et al. |
| 2013/0185433 | A1 | 7/2013 | Zhu et al. |
| 2013/0227543 | A1 | 8/2013 | Chen |
| 2013/0346973 | A1 | 12/2013 | Oda et al. |
| 2014/0082142 | A1 | 3/2014 | Geffin |
| 2014/0187173 | A1 | 7/2014 | Partee |
| 2014/0281577 | A1 | 9/2014 | Nicholes |
| 2014/0304718 | A1 | 10/2014 | Gambardella et al. |
| 2015/0106496 | A1 | 4/2015 | Tsao |
| 2015/0243140 | A1 | 8/2015 | Barrett |
| 2015/0277969 | A1 | 10/2015 | Strauss et al. |
| 2016/0055167 | A1 | 2/2016 | Vidwans et al. |
| 2016/0092204 | A1 | 3/2016 | Katkere et al. |
| 2016/0092533 | A1 | 3/2016 | Shank |
| 2016/0275772 | A1 | 9/2016 | Apcar |
| 2016/0357546 | A1 | 12/2016 | Chang et al. |
| 2016/0378532 | A1 | 12/2016 | Vincent et al. |
| 2017/0068527 | A1 | 3/2017 | Wang et al. |
| 2017/0147322 | A1 | 5/2017 | Vopni et al. |
| 2017/0344400 | A1 | 11/2017 | Birke et al. |
| 2018/0088639 | A1 | 3/2018 | Remis et al. |
| 2018/0101245 | A1 | 4/2018 | Sewlochan et al. |
| 2018/0307517 | A1 | 10/2018 | Devendran et al. |
| 2018/0349161 | A1 | 12/2018 | Jain et al. |
| 2019/0132815 | A1 | 5/2019 | Zampini, II et al. |
| 2019/0220271 | A1 | 7/2019 | Olderdissen et al. |
| 2019/0332409 | A1 | 10/2019 | Fried-gintis et al. |
| 2019/0332412 | A1 | 10/2019 | Boggarapu et al. |
| 2020/0026505 | A1 | 1/2020 | Olderdissen |

OTHER PUBLICATIONS

Cano, Ignacio et al. "Curator: Self-Managing Storage for Enterprise Clusters"; University of Washington; published Mar. 2017; pp. all.

U.S. Appl. No. 15/821,606, entitled "Managing Firmware in Distributed Computing Systems", filed Nov. 22, 2017 (PAT-168), pp. all.

U.S. Appl. No. 15/821,624, entitled "Managing Concurrent Firmware Operations in Distributed Computing Systems", filed Nov. 22, 2017 (PAT-262), pp. all.

U.S. Appl. No. 15/821,646, entitled "Scheduling Firmware Operations in Distributed Computing Systems", filed Nov. 22, 2017 (PAT-261), pp. all.

U.S. Appl. No. 15/872,792, entitled "Scheduling Upgrades in Distributed Computing Systems", filed Jan. 16, 2018, pp. all.

U.S. Appl. No. 15/963,533, titled "Identification and Storage of Logical to Physical Address Associations for Components in Virtualized Systems", filed Apr. 26, 2018, pp. all.

U.S. Appl. No. 15/965,584 titled "Virtualized Systems Having Hardware Interface Services for Controlling Hardware", filed Apr. 27, 2018, pp. all.

Apple Support: "Update the IOS on Your Iphone, Ipad, or Ipod Touch", https://support.apple.com/en-au/HT204204 published Sep. 19, 2017, captured Nov. 21, 2017, pp. all.

DMTF "Distributed Management Task Force, Inc."; https://www.dmtf.org/standards/redfish captured Nov. 21, 2017 @ 8:43 am, pp. all.

Krutov, et al. "Deploying Flex System in a Bladecenter Environment", Lenovo Press, Apr. 2015, pp. 1-132.

Microsoft "Get Started With Windows Server Update Services (WSUS)", captured 2017, pp. all.

Poitras, Steven. "The Nutanix Bible" (Jan. 11, 2014), from http://stevenpoitras.com/the-nutanix-bible/ (Publication date based on indicated capture date by Archive.org; first publication date unknown), pp. all.

Poitras, Steven, "The Nutanix Bible" (Jan. 12, 2016), from https://nutanixbible.com/ pp. all.

Poitras, Steven, "The Nutanix Bible" (Oct. 15, 2013), from http://stevenpoitras.com/the-nutanix-bible/ (Publication date based on indicated capture date by Archive.org; first publication date unknown), pp. all.

Poitras, Steven. "The Nutanix Bible" (Jun. 20, 2014), from http://stevenpoitras.com/the-nutanix-bible/ (Publication date based on indicated capture date by Archive.org; first publication date unknown), pp. all.

Poitras, Steven. "The Nutanix Bible" (Jun. 25, 2018), from http://nutanixbible.com/ pp. all.

Poitras, Steven. "The Nutanix Bible" (Jan. 3, 2017), from http://nutanixbible.com/ pp. all.

Poitras, Steven. "The Nutanix Bible" (Jan. 3, 2018), from http://nutanixbible.com/ pp. all.

Poitras, Steven. "The Nutanix Bible" (Sep. 4, 2015), from http://nutanixbible.com/ pp. all.

Poitras, Steven. "The Nutanix Bible" (Jan. 7, 2015), from http://stevenpoitras.com/the-nutanix-bible/ (Publication date based on indicated capture date by Archive.org; first publication date unknown), pp. all.

Poitras, Steven. "The Nutanix Bible" (Jan. 8, 2019), from https://nutanixbible.com/ pp. all.

(56) References Cited

OTHER PUBLICATIONS

Poitras, Steven, "The Nutanix Bible" (Jun. 8, 2017), from https://nutanixbible.com/ pp. all.
Poitras, Steven. "The Nutanix Bible" (Jun. 9, 2015), from http://stevenpoitras.com/the-nutanix-bible/ (Publication date based on indicated capture date by Archive.org; first publication date unknown), pp. all.
Poitras, Steven, "The Nutanix Bible" (Jun. 9, 2016), from https://nutanixbible.com/ pp. all.
Wikipedia: "Manifest File", http://en.wikipedia.org/w/index.php?title=Manifest_file&oldid=786852577 published Jun. 22, 2017, captured on Nov. 21, 2017, pp. all.
Poitras, Steven. "The Nutanix Bible" (Jul. 25, 2019), from https://nutanixbible.com/ pp. all.
Poitras, Steven, "The Nutanix Bible" (Sep. 17, 2019), from https://nutanixbible.com/ pp. all.
Poitras, Steven, "The Nutanix Bible" (Mar. 2, 2020), from https://nutanixbible.com/ pp. all.

\* cited by examiner

SCHEDULING UPGRADES IN DISTRIBUTED COMPUTING SYSTEMS

CROSS REFERENCE TO RELATED APPLICATION(S)

This application is a continuation of U.S. patent application Ser. No. 15/872,792 filed Jan. 16, 2018 and issued as U.S. Pat. No. 10,642,603 on May 5, 2020. The aforementioned application, and issued patent, is incorporated herein by reference, in its entirety, for any purpose.

FIELD

This disclosure relates to computing platform management, and more particularly to techniques for managing upgrades in distributed computing systems.

BACKGROUND

Modern distributed computing systems comprise components that are combined to achieve efficient scaling of distributed computing resources, distributed data storage resources, distributed networking resources, and/or other resources. Such distributed computing systems have evolved in such a way that incremental linear scaling can be accomplished in many dimensions. The resources in a given distributed computing system are often grouped into resource subsystems such as clusters, datacenters, or sites. The resource subsystems can be defined by physical and/or logical boundaries. For example, a cluster might comprise a logically bounded set of nodes associated with a certain department of an enterprise, while a datacenter might be associated with a particular physical geographical location. Modern clusters in a distributed computing system might support over one hundred nodes (or more) that in turn support as many as several thousands (or more) autonomous virtualized entities (VEs). The VEs in distributed computing systems might be virtual machines (VMs) and/or executable containers in hypervisor-assisted virtualization environments and/or in operating system virtualization environments, respectively.

Components of the distributed computing systems (e.g., motherboards, motherboard integrated circuits, storage devices, network adapters, etc.) often employ firmware to facilitate operation of the components. For example, the motherboard, network interface card, hard disk drive (HDD), and/or other components associated with each of the hundreds of nodes in a cluster can each have its own respective set of firmware. The components, associated firmware images, and firmware management software tools can be delivered by multiple vendors, each vendor delivering firmware and tools pertaining to that vendor's component or components. The vendor-specific firmware tools and firmware management methods can vary greatly. Further, the firmware for a given component may undergo several updates or revisions over the life cycle of the component, some of which updates are deemed "critical" to proper operation of the component. For example, a critical update may address an issue pertaining to the proper operation and/or security of the component.

Unfortunately, use of vendor-specific techniques to manage firmware in a distributed computing system present limitations at least as pertaining to efficiently updating component firmware from multiple vendors in the system. Specifically, use of vendor-provided tools rely on the system administrator to understand and use the vendor-specific tools for a given component to be upgraded. Implementing such an approach across a distributed computing system that has a large number of components from numerous vendors can consume significant human and computing resources and introduce availability, security, and/or other risks into the system. For example, running a particular vendor-specific firmware management tool for a given component in a node might require a system administrator to bring down the node in order to change its operating system environment to perform a firmware update. The node can then be brought back up by rebooting it in the prior operating system environment. All of the aforementioned approaches present challenges for managing the entire corpus of highly dynamic firmware updates.

Specifically, use of the aforementioned vendor-specific techniques often negatively impact system resource performance and/or availability. With such techniques, for example, the VEs and associated workloads on the node or nodes that are being updated are rendered unavailable during the update process, thus negatively impacting computing resource availability and possibly negatively affecting the user experience. Also, running the vendor-specific tools on certain nodes selected to perform the firmware operations may result in a resource imbalance in the system. In some cases, the selected nodes might fail to complete certain operations due to, for example, insufficient memory and/or storage space. What is needed is a way to schedule resources for performing firmware updates.

Still further, nodes may utilize a variety of software components—including operating systems, hypervisors, and/or other software applications. These software components may also have updates from time to time, and it may be desirable to update software components in a computing system. In some examples, there may be dependencies between software and firmware updates. For example, an operating system or hypervisor update may be desirably performed prior to installation of a particular firmware update. Moreover software components often tend to have dependencies on other software packages. For example, an independently updatable software entity may have dependency on a specific version of the underlying operating system. Managing updates of software and firmware components across a distributed computing system may accordingly be challenging.

BRIEF DESCRIPTION OF THE DRAWINGS

The drawings described below are for illustration purposes only. The drawings are not intended to limit the scope of the present disclosure.

DETAILED DESCRIPTION

Figure 1A:
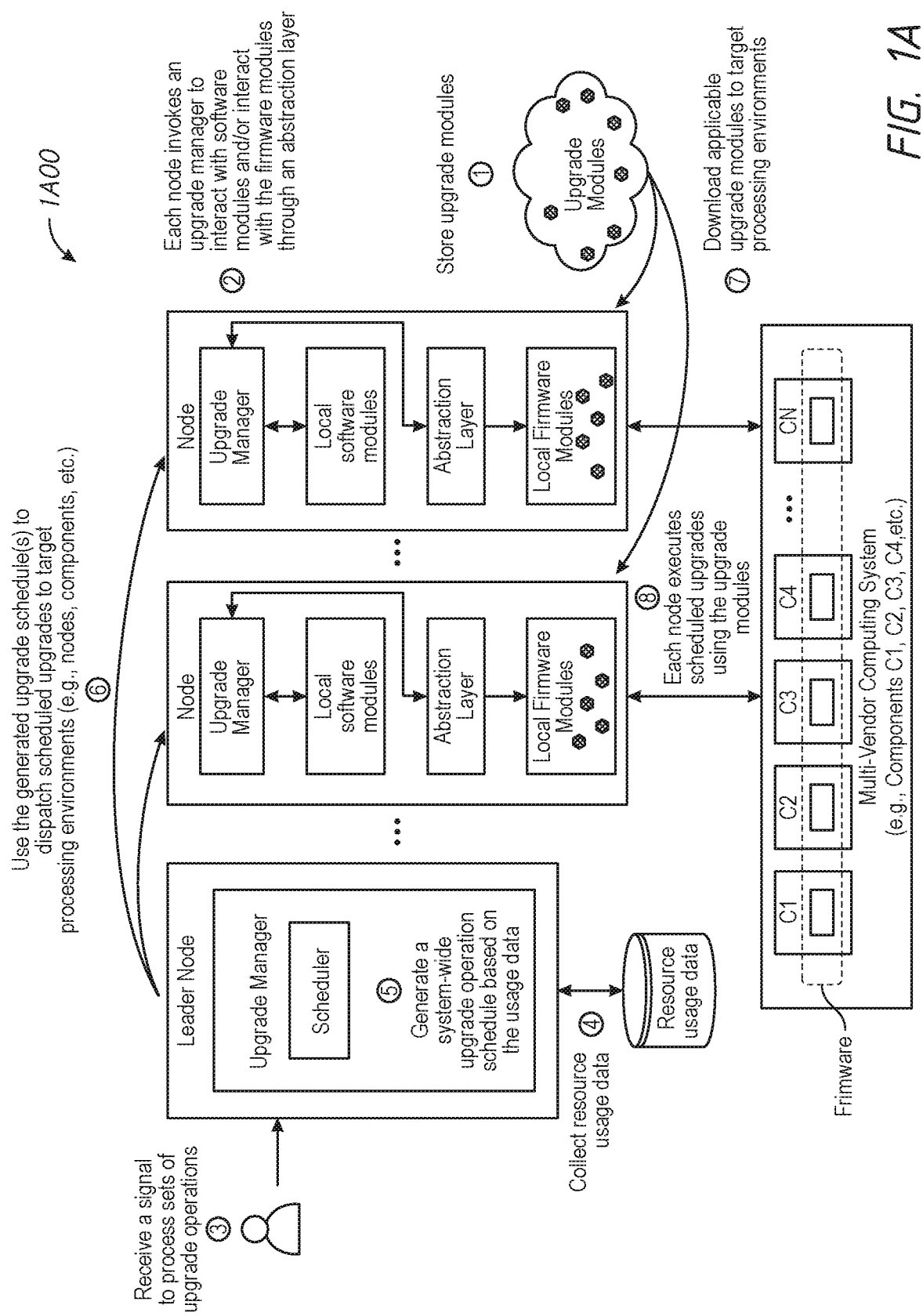
FIG. 1A presents an upgrade scheduling technique as implemented in a distributed computing system, according to an embodiment.

Embodiments in accordance with the present disclosure may address the problem of efficiently updating components, including software and firmware from multiple vendors, in a distributed computing system. Some examples may include approaches for implementing an upgrade management framework to interact with upgrade management plug-ins, in some examples firmware management plug-ins may be provided which may include vendor-specific firmware tools and update images to facilitate scheduling of upgrade management operations, including software and firmware components, in distributed computing systems. The accompanying figures and discussions herein present example environments, systems, methods, and computer program products for managing upgrades, including upgrades of software and firmware components, in distributed computing systems.

Disclosed herein are techniques for implementing an upgrade management framework. The upgrade management framework may interact with software and/or firmware modules, such firmware management plug-ins comprising vendor-specific firmware tools and update images. The framework may facilitate scheduling of component upgrades in distributed computing systems so as to reduce or eliminate downtime. In some embodiments, a set of firmware management plug-ins interact so as to support vendor-specific firmware operations such as querying component firmware status, updating component firmware, managing firmware dependencies, transferring firmware images, and/or other vendor-specific operations. A vendor-agnostic programming interface between the firmware management framework and the firmware management plug-ins is provided to abstract the vendor-specific firmware operations to a set of generic (e.g., vendor-agnostic) firmware characteristics, which characteristics in turn pertain to or are mapped to function calls, process invocations, remote procedure calls, message exchanges, etc. The generic firmware characteristics are used to invoke collecting firmware status, executing firmware updates, and/or to perform other operations pertaining to the multi-vendor firmware.

In some embodiments, the software modules and/or firmware modules used for upgrade, such as firmware management plug-ins, are stored in a cloud-based repository. In other embodiments, the upgrade management plug-in repository is updated atomically. In some embodiments, the upgrade management plug-in repository is hosted internally to support "dark site" operations. In certain embodiments, resource usage balancing techniques are used to schedule and/or distribute the execution of the various upgrade operations across the distributed computing system.

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE
EMBODIMENTS

FIG. 1A presents an upgrade operation scheduling technique 1A00 as implemented in a distributed computing system. As an option, one or more variations of upgrade operation scheduling technique 1A00 or any aspect thereof may be implemented in the context of the architecture and functionality of the embodiments described herein. The upgrade operation scheduling technique 1A00 or any aspect thereof may be implemented in any environment.

Clustered computing systems (e.g., distributed computing systems) comprising many upgradable components can introduce problems pertaining to efficiently performing upgrades. For example, some techniques for performing upgrade operations (e.g., updates) in such computing systems result in the VEs and associated workloads on the node or nodes being updated to be rendered unavailable during the update process, thus negatively impacting computing resource availability and possibly negatively affecting the user experience. Also, performing upgrade operations on certain nodes selected to perform the operations may result in a resource imbalance in the system.

The herein disclosed techniques can address such deficiencies by creating a set of upgrade modules—e.g., software modules and/or firmware modules for use in upgrading components of the distributed computing system. One or more upgrade managers may be used to detect current versions of multiple components in a computing system, such as software components and/or firmware components. For example, the upgrade managers may detect current versions of firmware components, operating systems, hypervisors, applications, or combinations thereof. Note that generally a distributed computing system described herein may include multiple computing nodes, each computing node configured to execute an operating system, a hypervisor, and multiple virtual machines including a controller virtual machine. The controller virtual machine may be used to manage input/output requests between the multiple virtual machines and a storage pool shared among the multiple computing nodes.

Based on the detected versions of the components, the upgrade manager may obtain a group of updates for the computing system and schedule installation of the group of updates. In scheduling the installation, the upgrade manager may take dependencies between the updates into consideration. For example, the upgrade manager may schedule certain upgrades to be performed first before certain other upgrades which desire installation of the certain upgrades for their function. In some examples, scheduling the installation may include grouping together installation of selected ones of the group of updates for a particular computing node according to which ones of the group of updates utilize a particular state change of the computing node during the installation. For example, the upgrade manager could group together upgrades which utilize a boot into a different operating environment (e.g., using a different operating system) for their installation. In this manner, for a particular computing node, the computing node may boot into the different operating environment a single time for installation of multiple upgrades. This may reduce downtime of the computing node if booting into the different operating environment may occur once for multiple upgrade installations rather than occurring multiple times for the multiple upgrade installations.

Accordingly, examples of systems described herein may provide a repository of upgrade modules (operation 1). Some of those upgrade modules may be software upgrade modules, some may be firmware upgrade modules. In some examples, the firmware upgrade modules may implement a vendor-agnostic interface to a set of vendor-specific firmware operations. Multiple instances of an upgrade manager may be implemented in the clustered computing system to interact with the upgrade modules, in some instances (e.g., in the case of the vendor-agnostic firmware upgrade modules) through an abstraction layer (operation 2). When upgrade operations are invoked at the system (e.g., at the upgrade manager at a leader node) (operation 3), the upgrade manager may detect a current version of certain components of the computing system (e.g., operating system, hypervisor, applications, firmware of the various computing nodes). The upgrade manager may consult the repository of upgrade modules to identify a group of upgrade modules available for upgrading the components of the system. To schedule installation of this group of upgrade modules, a set of resource usage data for the system may be collected and/or a set of data may be collected regarding state changes used by the upgrades (operation 4) to generate an upgrade operation schedule (operation 5). For example, load balancing techniques can be applied to the resource usage data to determine a target processing environment (e.g., node), a scheduled execution time, and/or other attributes for each of the upgrade instructions to be executed to carry out the upgrade operations. The upgrade instructions are then dispatched to the upgrade managers at the target processing environments (operation 6). The upgrade modules identified to process the scheduled upgrade instructions at each target processing environment are then downloaded (operation 7). The dispatched upgrade instructions are then performed on the nodes, including in some examples on the multi-vendor cluster components (e.g., C1, C2, C3, C4, . . . , CN) in accordance with the generated schedule (operation 8).

The shown abstraction layer for vendor-agnostic firmware upgrade instructions is merely one implementation choice. Other techniques for abstraction include wrappers, services, pointers, etc. Moreover, any of the foregoing implementation choices for abstraction can include logic that performs normalization between the various vendor-supplied firmware information. Specifically, one vendor might describe memory in units of megabytes, whereas another vendor might describe memory in units of gigabytes. Various normalization techniques (e.g., unit-specific normalization) can be applied to any vendor-supplied information. Also, any such normalization techniques can be subsumed into any embodiment of an abstraction layer. Further details describing abstraction techniques and their uses for upgrade management are described herein.

Figure 1B:
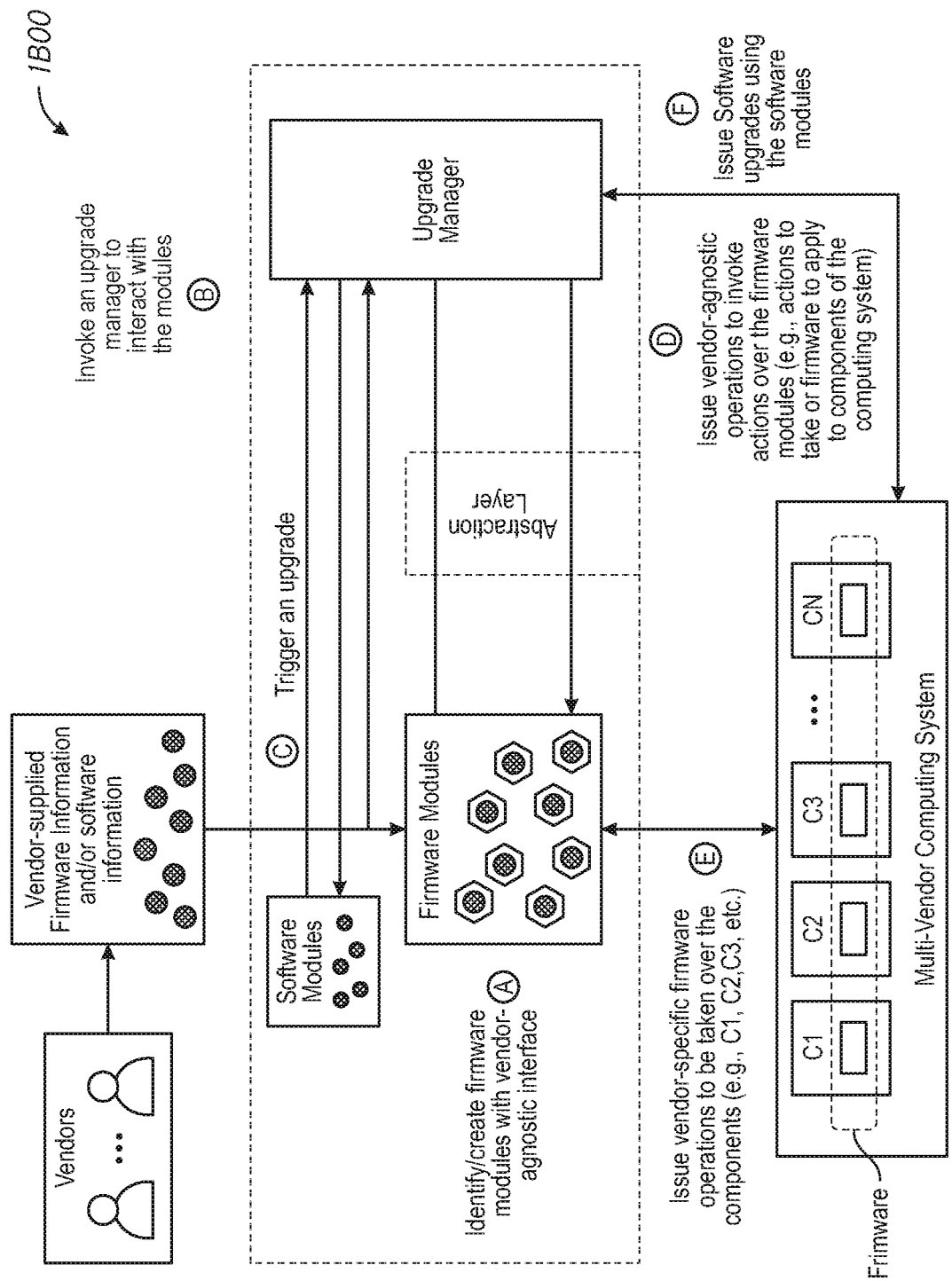
FIG. 1B presents an upgrade technique including a component message abstraction technique as implemented in a distributed computing system, according to an embodiment.

Further details describing the herein disclosed upgrade management techniques are shown and described as pertaining to FIG. 1B.

FIG. 1B presents an upgrade message technique 1B00 as implemented in a distributed computing system. As an option, one or more variations of upgrade message technique 1B00 or any aspect thereof may be implemented in the context of the architecture and functionality of the embodiments described herein. The upgrade message technique 1B00 or any aspect thereof may be implemented in any environment.

Clustered computing systems (e.g., distributed computing systems) comprising many upgradable components (e.g., software, firmware) from multiple vendors can introduce problems pertaining to efficiently managing the component upgrades. Techniques that use vendor-specific tools to manage (e.g., enumerate, update, etc.) the firmware for a large number of multi-vendor components having dynamically changing firmware information (e.g., firmware management tools, firmware images, etc.) are deficient at least as pertains to the resources consumed to manage the firmware. Other techniques for upgrade may introduce undesirable downtime of one or more computing nodes if nodes are upgraded in parallel and/or if a node is booted multiple times into a different operating environment for installation of upgrades.

The herein disclosed techniques can address such deficiencies in some examples in part by grouping together upgrades for each node which utilize one or more same state changes for a node. A variety of state changes may be used to group upgrades described herein, such as but not limited to, booting into a different operating environment (e.g., utilizing a different operating system than during normal operation and/or utilize a 'safe mode'), and/or rebooting into a same operating environment. In some examples, a group of upgrades may include upgrades utilizing multiple state changes to complete an upgrade. In some examples, some upgrades may only utilize one stage change, or no state changes. Other state changes may be used in other examples.

Referring to FIG. 1B, some examples of upgrade techniques may include creating a set of software modules and/or firmware modules (operation A). The firmware modules may implement a vendor-agnostic interface to a set of vendor-specific firmware operations. An upgrade manager is implemented in the clustered computing system to interact with upgrade modules, including firmware modules (operation B). The upgrade manager may interact with the firmware modules through an abstraction layer. At some point in time, software and/or vendor firmware information may change, which in turn may trigger updates to the modules to reflect the dynamically changing information (operation C). The vendor-agnostic firmware messages issued from the upgrade manager to the firmware modules (operation D) are transformed to vendor-specific firmware operations issued to the multi-vendor components (operation E). Certain messages and operations can be scheduled to carry out various firmware operations (e.g., enumerate, update, etc.) at the multi-vendor computing components (e.g., C1, C2, C3, . . . , CN). In some examples, software upgrades may be issued using the software modules (operation F). In this manner, both software and firmware may be upgraded in examples described herein.

The multi-vendor computing system of FIG. 1B can be implemented in a clustered computing environment. In particular, the shown multi-vendor computing components (e.g., C1, C2, C3, . . . , CN) might implement computing nodes that can each access a shared storage facility such as a storage pool. Furthermore, the computing components can each host a respective instance of a storage controller (e.g., a controller virtual machine) that accesses the aforementioned shared storage facility. Any computing node can communicate to any other computing node via its instance of the storage controller, and/or via data storage at the shared storage facility and/or can communicate with each other via a local area network. Further details pertaining to computing clusters are given below in the discussions of FIG. 7, FIG. 8A, FIG. 8B, and FIG. 8C, as well as in other places infra. The foregoing and subsequent discussions pertaining to clusters are non-limiting, and are provided merely for illustration. In particular, the disclosed techniques and configurations for upgrade management can be practiced in many different computing environments, including in computing environments that do not comport with the metes and bounds of a computing cluster.

Figure 1C:
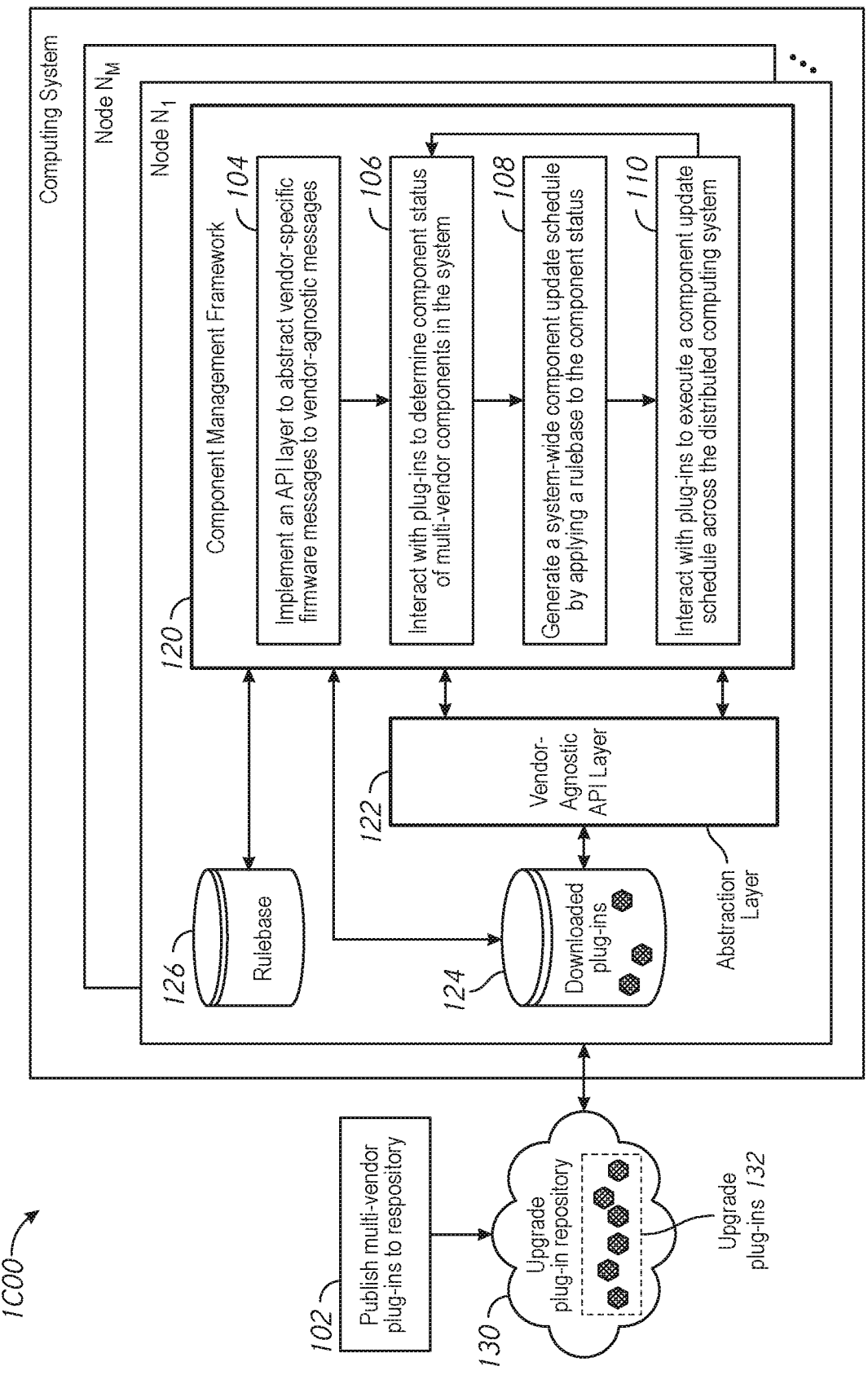
FIG. 1C presents an upgrade management technique as implemented in a distributed computing system, according to an embodiment.

FIG. 1C presents an upgrade management technique 1 C00 as implemented in a distributed computing system. As an option, one or more variations of upgrade management technique 1C00 or any aspect thereof may be implemented in the context of the architecture and functionality of the embodiments described herein. The upgrade management technique 1C00 or any aspect thereof may be implemented in any environment.

The embodiment shown in FIG. 1C is merely one example implementation of the herein disclosed techniques to manage (e.g., detect, enumerate, update, upgrade, etc.) the components (e.g., software and/or multi-vendor firmware) of a distributed computing system. For example, the shown embodiment depicts a component management framework 120 implemented in one node (e.g., node $N_1$) of a distributed computing system. Component management framework 120 can be implemented in any of the nodes (e.g., node $N_M$, etc.) of the distributed computing system. A software framework, such as component management framework 120, may be a logical abstraction in which a certain set of shared programming objects (e.g., programming code) providing generic functionality can be selectively overridden or specialized by programming objects (e.g., programming code) providing specific functionality. As disclosed herein, a set of plug-ins (e.g., modules) may be provided which may refer to upgrade plug-ins for software and/or firmware components. In some examples, a set of generic (e.g., vendor-agnostic) firmware functions and/or messages are processed by various vendor-specific firmware programming objects (e.g., firmware management tools, firmware update images, etc.) associated with a set of upgrade plug-ins 132. In some examples, some upgrade plug-ins 132 may be associated with software components. In some examples, the vendor-specific firmware programming objects at the plug-ins serve to issue and/or receive certain vendor-specific firmware messages to and/or from the multi-vendor firmware at the distributed computing system. The framework facilitates scheduling of upgrade management operations in the distributed computing system so as to reduce or eliminate downtime. Such upgrade management operations include querying component status, updating component software and/or firmware, managing upgrade component dependencies, transferring upgrade images for software and/or firmware, and/or other operations.

As can be observed in FIG. 1C, a vendor-agnostic application programming interface (API) layer (e.g., vendor-agnostic API layer 122) between upgrade management framework 120 and upgrade plug-ins 132 is implemented to abstract the vendor-specific firmware programming objects for firmware management plug-ins of 132 to the generic (e.g., vendor-agnostic) firmware-related interactions (e.g., function calls, remote procedure invocations, messages, etc.) raised by component management framework 120. Vendor-agnostic API layer 122 is a logical abstraction layer representing the aforementioned transformation of generic programming objects (e.g., vendor-agnostic firmware messages) from a given framework (e.g., firmware management framework 120) to custom or specialized programming objects (e.g., vendor-specific programming objects at the firmware management plug-ins of 132).

The programming code to perform the abstraction can vary in implementation and/or location. For example, and as described herein (see FIG. 3A), at least a portion of the abstraction layer can be implemented in an API wrapper based on a RESTful API at instances of firmware management plug-ins 132. Other API layer implementations such as function calls, and remote procedure calls and methods are possible. The generic messages which in some examples are transformed by the vendor-agnostic API layer 122 are used to invoke collecting component status, executing component updates, and/or to perform other operations pertaining to the components (e.g., software components and/or firmware components). In the shown embodiment, the upgrade plug-ins 132 are stored in a cloud-based repository (e.g., upgrade plug-in repository 130), and downloaded locally (e.g., downloaded plug-ins 124) to facilitate certain upgrade operations. In some embodiments, the entire upgrade plug-in repository is hosted internally to support "dark site" operations.

FIG. 1C further presents one embodiment of certain steps and/or operations for managing the components in the shown distributed computing systems, according to the herein disclosed techniques. For example, such steps and/or operations can include publishing to a repository (e.g., upgrade plug-in repository 130) various upgrade plug-ins to support managing components (e.g., software and/or firmware) from multiple vendors (step 102). As illustrated, upgrade plug-in repository 130 can be a public cloud-based repository external to the distributed computing system. In certain embodiments, upgrade plug-in repository 130 is updated atomically so as to manage conflicts across multiple access points (e.g., nodes, users, etc.). As earlier described, a vendor-agnostic API layer 122 is implemented to abstract vendor-specific operations or characteristics to a set of generic operations or characteristics and/or vendor-agnostic messages (step 104). Vendor-agnostic API layer 122 enables component management framework 120 to interact with at least some of upgrade plug-ins 132 (e.g., downloaded plug-ins 124) to determine the component status of the multi-vendor components of the distributed computing system (step 106)—for example, the component status may refer to a version of current components in the distributed computing system. While the vendor-agnostic API layer is shown, in some examples (e.g., for software components), it may not be necessary to utilize an API layer, and the component management framework may communicate with an upgrade plug-in (e.g., an upgrade module) for a particular software component without a need for translation by an API layer. A system-wide (e.g., across multiple nodes) component update schedule may be generated by applying a rulebase 126 to the component status (step 108). The resulting schedule can include a portion of the schedule to execute operations sequentially and/or the resulting schedule can include a portion of the schedule, execute the operations in parallel over nodes of the distributed computing system. Determination of when to employ sequentially-executed operations and/or when to employ parallelized operations can be facilitated through use of the rulebase. In some examples, the schedule may specify which upgrades may be grouped together which utilize a same state change such that the group of upgrades may be executed using a single state change (e.g., boot into an operating environment different than a normal operating environment).

An instance of a rulebase can be retrieved or downloaded from any location (e.g., from a cloud repository). Upgrade rules for each component are part of the modules downloaded from the cloud, and the rulebase can augment the upgrade rules and/or supplant the upgrade rules. Rules can be codified in the framework or can be a data driven part of the framework (as shown). More specifically, a rulebase, such as rulebase 126, comprises data records storing various attributes that can be applied to constrain certain functions and/or operations. For example, certain attributes in rulebase 126 pertaining to component versions might constrain an upgrade of a particular component to a particular version level to occur if, and only if, another component is at a specified version level. As another example, certain attributes in rulebase 126 pertaining to resource service levels might constrain changing the operating environment of certain components for performing upgrades to specified time periods. The update schedule, derived in part from rulebase 126, is executed across the distributed computing system by instances of the component management framework interacting with locally downloaded management plug-ins (step 110).

In some situations, a rulebase can be used to determine the name and other characteristics of a target environment, such as if and when the expected target environment for a particular module has as a prerequisite. Target environment characteristics can include hypervisor names and versions, operating system names and versions, firmware update environment version numbers, etc. In many cases there are dependencies within a target environment. In addition to names, versions, dependencies, etc., other flags can be used to indicate to the framework whether or not a particular state change is to be used—e.g., the host or constituent components need to be rebooted and/or whether or not the system as a whole is to be subjected to a hard reboot by a power cycle. Even further, certain flags can specify whether or not a particular new upgrade needs to be atomic such that no other upgrade is allowed to commence until the particular component upgrade has been completed and verified.

In certain embodiments, resource usage balancing techniques are used to schedule and/or distribute the execution of the various upgrade operations across the distributed computing system. For example, a given update schedule might comprise a plurality of component update activities (e.g., software and/or firmware update activities), such as to instruct an instance of the framework (e.g., an instance that is implemented at a particular node), to interact with plug-ins downloaded to that node to update the firmware and/or software at that node or other nodes.

Figure 2A:
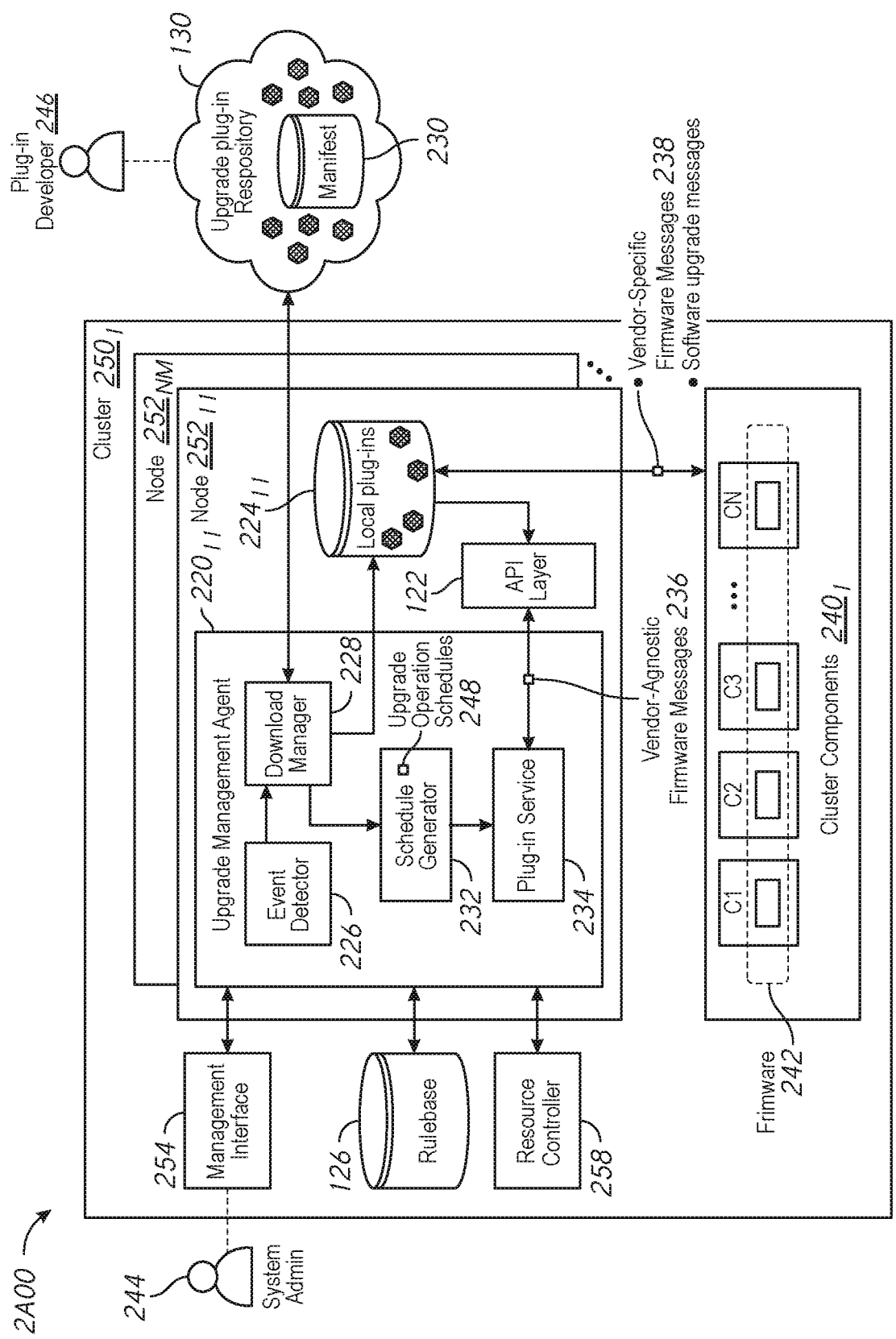
FIG. 2A presents an environment that supports various component scheduling and updating techniques as used in systems that manage software and multi-vendor firmware updates in distributed computing systems, according to an embodiment.

Further details describing the herein disclosed component management techniques are shown and described as pertaining to FIG. 2A.

FIG. 2A presents an environment 2A00 that supports various upgrade scheduling and techniques as used in systems that manage upgrades in distributed computing systems, including multi-vendor firmware updates in some examples. As an option, one or more variations of environment 2A00 or any aspect thereof may be implemented in the context of the architecture and functionality of the embodiments described herein.

The embodiment shown in FIG. 2A is merely one implementation of an upgrade management agent serving as a component management framework to facilitate management of components in large-scale distributed computing environments, according to the herein disclosed techniques. As can be observed, an instance of an upgrade management agent (e.g., upgrade management agent $220_{11}$) is implemented in a representative cluster (e.g., cluster $250_1$) of a distributed computing system. As shown, upgrade management agent $220_{11}$ is implemented in a node $252_{11}$ of cluster $250_1$. Other instances of the upgrade management agent might be implemented in other nodes (e.g., node $252_{NM}$, etc.) of cluster $250_1$ and/or other clusters of the distributed computing system. A representative set of cluster components $240_1$ (e.g., C1, C2, C3, . . . , CN) comprising respective sets of components, such as firmware 242 is also shown.

According to the shown embodiment, upgrade management agent $220_{11}$ comprises an event detector 226 to detect various events that might invoke a component operation. As an example, event detector 226 might receive a message from a user (e.g., system admin 244) at a management interface 254 to invoke a certain component operation (e.g., enumerate component status, update component, etc.). Upgrade management agent $220_{11}$ further comprises a download manager 228 to select certain plug-ins at plug-in repository 130 for download to a set of local plug-ins $224_{11}$ at node $252_{11}$. A manifest 230 at the plug-in repository 130 can support various operations at download manager 228 at upgrade management agent $220_{11}$.

A manifest, such as manifest 230, is a set of data records describing the items comprising a set of bounded content to facilitate efficient indexing of the items. Specifically, manifest 230 describes the various plug-ins stored at plug-in repository 130 to facilitate various operations (e.g., search, sort, select, download, etc.) pertaining to the plug-ins. More specifically, manifest 230 comprises metadata created by one or more plug-in developers (e.g., plug-in developer 246) at publication of the plug-ins to the repository. In some embodiments, a manifest is persisted as a manifest file. In other embodiments, a manifest is a data structure that is maintained as a computing object. A manifest may enumerate a set of files or components (e.g., software modules and/or firmware modules) that are included in a particular configuration. For example, the manifest may enumerate a current version of multiple components in a distributed computing system. The manifest can be processed by any computing components and/or can be read by a human. In addition to listing the aforementioned set of files or components, manifests may contain additional information; for example, in an environment that supports the Java programming language, a manifest might specify a version number and an entry point for execution. In some cases, the manifest may be accessed using cryptographic signature, or hash, or checksum. In situations where a cryptographic signature or hash or checksum is used to access a manifest, the contents of the manifest can be validated for authenticity and integrity. Further details describing the manifest metadata are shown and described as pertaining to FIG. 3C.

Schedule Generator

A schedule generator 232 at upgrade management agent $220_{11}$ uses information from download manager 228 (e.g., pertaining to local plug-ins $224_{11}$), rulebase 126, and/or other sources to generate instances of upgrade operation schedules 248. The upgrade operation schedules generated by the schedule generator comprise time-based sequences of instructions to carry out one or more upgrade operations, such as component enumeration or component updates. In some cases, schedule generator 232 might interact with a resource controller 258 at cluster $250_1$ to collect resource usage metrics to be used to determine certain attributes (e.g., execution time, execution location, etc.) of the instructions associated with the upgrade operation schedules 248. For example, such resource usage metrics might indicate that a certain node in cluster $250_1$ has resources available to host the plug-in download operations, component enumeration operations, component update operations, and/or other upgrade operations for a particular portion of the cluster components $240_1$.

The instructions comprising the upgrade operation schedules 248 are processed by a plug-in service 234 at upgrade management agent $220_{11}$ to issue instances of vendor-agnostic firmware-related function calls, remote procedure invocations, vendor-agnostic firmware messages 236 (as shown), and/or communicate with one or more software modules. In some examples, communication may be through an API layer 122 to local plug-ins $224_{11}$. The vendor-agnostic firmware messages 236 are transformed by the API layer 122 and/or the local plug-ins $224_{11}$ to a set of vendor-specific firmware-related function calls, vendor-specific firmware-related commands, vendor-specific remote procedure invocations, and/or vendor-specific firmware messages 238 issued to and/or received from the cluster components $240_1$. Vendor-specific firmware messages 238 serve to carry out various vendor-specific operations associated with firmware 242 of cluster components $240_1$. Software upgrade messages may facilitate upgrade of software components in the cluster components $240_1$.

The components and data flows shown in FIG. 2A presents merely one partitioning and associated data manipulation approach. The specific example shown is purely exemplary, and other subsystems and/or partitioning are reasonable. Examples of protocols that can be implemented in such systems, subsystems, and/or partitionings according to the herein disclosed techniques are presented and discussed as pertains to FIG. 2B.

Figure 2B:
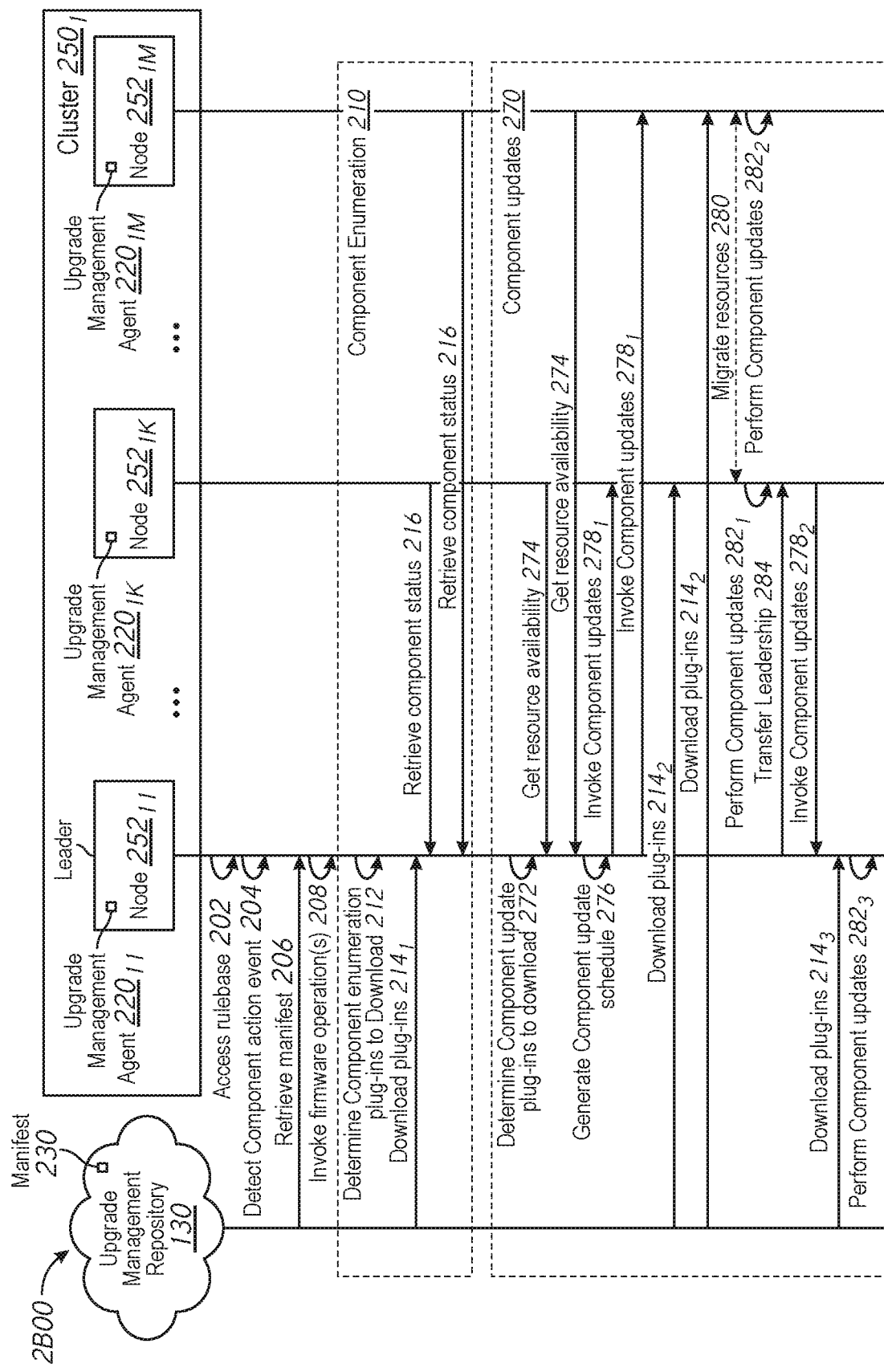
FIG. 2B presents an interaction diagram showing an inter-component protocol that facilitates carrying out upgrades including multi-vendor firmware updates in distributed computing systems, according to an embodiment.

FIG. 2B presents an interaction diagram 2B00 showing an inter-component protocol that facilitates carrying out component updates in distributed computing systems. As an option, one or more variations of interaction diagram 2B00 or any aspect thereof may be implemented in the context of the architecture and functionality of the embodiments described herein. The interaction diagram 2B00 or any aspect thereof may be implemented in any environment.

Interaction diagram 2B00 presents various upgrade scheduling and updating techniques earlier described as pertaining to FIG. 2A that can exhibit a set of high order interactions (e.g., operations, messages, etc.) to facilitate implementations of the herein disclosed techniques. Specifically shown are a cluster $250_1$ that hosts representative node instances shown as node $252_{11}$, . . . , node $252_{1K}$, . . . , node $252_{1M}$), which nodes operate over local plug-ins, and an upgrade plug-in repository 130.

As shown, each representative node comprises an instance of the upgrade management agent (e.g., upgrade management agent $220_{11}$, . . . , upgrade management agent $220_{1K}$, . . . , upgrade management agent $220_{1M}$). Further, as performed in certain embodiments and implementations, node $252_{11}$ is depicted as the elected leader node in cluster $250_1$. As the leader node, node $252_{11}$ can access a rulebase at cluster $250_1$ that pertains to upgrade management at the cluster (operation 202). Certain upgrade action events are also detected at node $252_{11}$ (operation 204). For example, an event detector at upgrade management agent $220_{11}$ might detect changes to the manifest 230 and/or upgrade plug-in repository 130, and/or or receive other messages (e.g., from a user) and/or signals that invoke component-related action. In such cases, the then-current manifest is retrieved from the repository (message 206), and one or more component operations are invoked (operation 208). As can be observed, such component operations can comprise interactions corresponding to a component enumeration 210 or a component update 270. Other upgrade operations and/or interactions are possible.

The component enumeration 210 can commence by determining the set of plug-ins for carrying out the component enumeration (operation 212). The selected component enumeration plug-ins are then downloaded from the repository to node $252_{11}$ (message $214_1$). Vendor-agnostic interactions originating from upgrade management agent $220_{11}$ to the downloaded enumeration plug-ins facilitate retrieval of the component status of the some or all of the components in cluster $250_1$ (messages 216). The retrieved component status can be used by component update 270 and/or other component operations.

Specifically, update 270 can commence by determining a set (e.g. a group) of update plug-ins for carrying out one or more component updates (operation 272). Various metrics pertaining to the usage and/or availability of resources in the cluster are collected (messages 274). The resource usage metrics, component status, rulebase, and/or other information are used to generate a component update schedule (operations 276). In many cases and embodiments, the component update schedule will specify a certain set of nodes from the cluster to carry out the component updates. As shown, such distributed update operations can be invoked by the upgrade management agent at the leader node (messages $278_1$). In response, each of the nodes performing the updates will download a portion of the selected update plug-ins corresponding to the updates scheduled for execution at a given node (messages $214_2$).

In some cases, component updates and/or enumeration can impact resource availability. For example, use of a node motherboard may be prohibited during an upgrade of the motherboard firmware. In such cases, the virtualized entities (e.g., virtual machines, containers, etc.) running on that node will not be available. As shown, to remediate such impact on availability and/or other issues pertaining to performing certain upgrade operations, resources can be migrated between nodes in the cluster (message 280). When any resource rescheduling (e.g., migration) is complete, the component updates are performed (operation $282_1$ and operation $282_2$). In many cases, the leader node (e.g., node $252_{11}$) transfers leadership (message 284) to another node (e.g., node $252_{1K}$) that can invoke the component updates associated with the earlier elected leader node (message $278_2$). As earlier described, node $252_{11}$ can then download the update plug-ins (message $214_3$) and perform the component updates (operation $282_3$) associated with node $252_{11}$.

As earlier mentioned, the update schedules are generated based on information from a plurality of data sources. Further details describing the content and structures of such information are shown and described as pertaining to FIG. 2C.

Figure 2C:
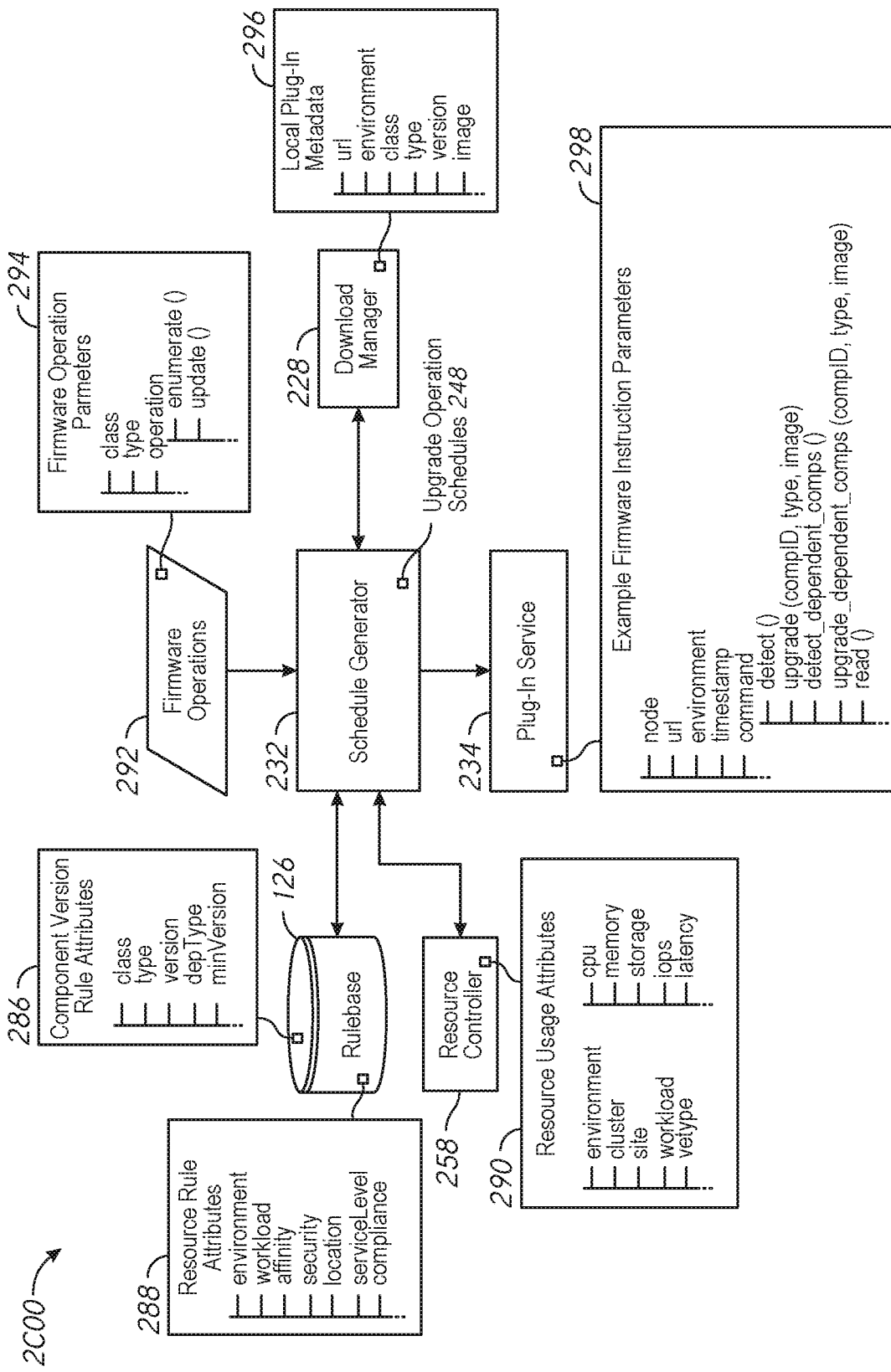
FIG. 2C depicts specialized data structures that are designed to improve the way a computer stores and retrieves data in memory when performing steps pertaining to managing upgrades in distributed computing systems, according to an embodiment.

FIG. 2C depicts specialized data structures 2C00 designed to improve the way a computer stores and retrieves data in memory when performing steps pertaining to managing upgrades including multi-vendor firmware updates in distributed computing systems.

As shown, the specialized data structures 2C00 pertain to various input data consumed by schedule generator 232 to generate instances of upgrade operation schedules 248 in response to receiving one or more firmware operations 292 and/or one or more other component operations. The upgrade operation schedules are, in turn, executed by plug-in service 234 by, in the case of firmware, issuing certain vendor-agnostic firmware instructions to firmware management plug-ins. The specialized data structures 2C00 organize such input and output data for high-performance generation and execution of upgrade operation schedules 248 in distributed computing systems.

As can be observed, in certain embodiments, schedule generator 232 can respond to firmware operations 292 characterized by a set of firmware operation parameters 294. Specifically, the firmware operations 292 might be presented to schedule generator 232 in a structured object form (e.g., JSON) describing a component "class", a component "type", a firmware "operation" (e.g., enumerate ( ), update ( ), etc.), and/or other parameters. For example, schedule generator 232 might detect a firmware operation calling for an update (e.g., update ( ) operation) of all SMC gen 3 motherboards (e.g., class=BMC and type=SMCg3). Schedule generator 232 applies data from rulebase 126, download manager 228, and resource controller 258 to firmware operations 292 to generate upgrade operation schedules 248 for execution by plug-in service 234. In some examples, the data may also be applied to software operations to generate the upgrade operation schedules 248 to include upgrades of software components.

For example, rulebase 126 can comprise various firmware and/or software version rules characterized by a set of component version rule attributes 286. The version rules described by version rule attributes 286 are a set of data records that describe constraints pertaining to version level interdependencies across the various components in a distributed computing system. As shown in firmware version rule attributes 286, firmware version rule constraints might pertain to such aspects as a component "class", a component "type", a firmware "version" level, a dependent component type or "depType", a dependent component minimum version level or "minVersion", and/or other aspects. For example, a given firmware version rule might constrain an upgrade of any C1 components (e.g., type=C1) to a version 1.1 (e.g., version=1.1) to occur if, and only if, any associated C2 components (e.g., depType=C2) are at version 3.0 or above (e.g., minVersion=3.0). Software components may have analogous rules. The component version rules are often organized and/or stored in a tabular structure (e.g., relational database table) having rows corresponding to a component class and columns corresponding to component version rule attributes or attribute elements associated with the component class. The component version rules can also be organized and/or stored in key-value pairs, where the key is the component version rule attribute or element of the attribute, and the value is the data element (e.g., number, character string, array, etc.) associated with the attribute or attribute element. Any of the foregoing structures and/or other structures can support one-to-many and many-to-one relationships between component version rule attributes 286. For example, a particular component type and/or version might have dependencies on multiple other components and/or versions.

Rulebase 126 can also comprise various resource rules characterized by a set of resource rule attributes 288. The resource rules described by resource rule attributes 288 are a set of data records that describe constraints pertaining to various aspects of the resources comprising the distributed computing system. As shown in resource rule attributes 288, resource rule constraints might pertain to such aspects as a resource "environment" (e.g., virtualization environment, operating system environment, etc.), a "workload" running on a set of resources, a resource (e.g., VM) "affinity", a resource "security" policy, a resource "location", a service level or "serviceLevel" associated with a resource, a regulation "compliance" associated with a resource, and/or other aspects. The resource rules are often organized and/or stored in a tabular structure (e.g., relational database table) having rows corresponding to a rule scope (e.g., environment, workload, etc.) and columns corresponding to resource rule attributes or attribute elements associated with the rule scope. The resource rules can also be organized and/or stored in key-value pairs, where the key is the resource rule attribute or element of the attribute, and the value is the data element (e.g., number, character string, array, etc.) associated with the attribute or attribute element. Any of the foregoing structures and/or other structures can support one-to-many and many-to-one relationships between resource rule attributes 288. For example, a particular environment might have multiple workloads which, in turn, are under one service level agreement.

Schedule generator 232 can further consume information from a resource controller 258 in the distributed computing environment. In some embodiments, resource controller 258 serves to manage (e.g., schedule, monitor, etc.) the resources (e.g., computing resources, storage resources, networking resources, etc.) in the distributed computing environment so as to facilitate efficient use and scaling of such resources. As such, resource controller 258 can provide the then-current, historical and, in some cases, predicted resource usage data. Such resource usage data serve to characterize the state of the resource utilization of a given resource environment (e.g., node, cluster, site, etc.) at a given moment or period in time.

For example, and as shown in resource usage attributes 290, resource usage data might describe various resource usage attributes for a given "environment", "cluster", "site", "workload", "data center" and/or another resource provider or consumer. Specifically, for any of the foregoing resource providers or consumers, the resource usage data might describe an associated virtualized entity type or "veType", a "cpu" usage, a "memory" usage, a "storage" usage, a storage input and/or output (I/O or IO) usage (e.g., I/O per second) or "iops", an access "latency" performance indicator, and/or other usage attributes. The resource usage data are often organized and/or stored in a tabular structure (e.g., relational database table) having rows corresponding to a certain resource provider or consumer (e.g., environment, cluster, site, or workload), and columns corresponding to resource usage attributes or attribute elements associated with the resource provider or consumer. For example, a row corresponding to a workload "vdi" might have a VE type column named "veType" and a memory usage column named "mem" with respective row entries of "type03" and "20 GB". Other examples of resource usage data might describe VM attributes, such as CPU type and/or storage type (e.g., SSD, HDD, etc.).

Examples of resource usage data might also describe certain attributes of a given workload (e.g., application) such as the set of VMs associated with the workload, the network connection and data flow between the VMs (e.g., NAT rules, open ports network connections, network bandwidth requirements, Internet traffic restrictions, etc.), the workload data characteristic (e.g., number of reads and writes, change in data over time, etc.), security policy (e.g., production security, development security, encryption, etc.), and/or other workload attributes. Any of the foregoing structures and/or other structures can support one-to-many and many-to-one relationships between resource usage attributes 290. For example, a particular cluster might have multiple VE types which, in turn, have various CPU, memory, and storage characteristics.

Download manager 228 can also present to schedule generator 232 certain local plug-in metadata 296 describing the locally stored (e.g., downloaded) upgrade plug-ins. Specifically, and as shown, local plug-in metadata 296 can characterize a location "url" for the plug-in, an operating system "environment" for the plug-in, a component "class" or list of classes supported by the plug-in, a component "type" or list of types supported by the plug-in, the "version" or list of versions available for each class and/or type, the upgrade "image" corresponding to the "version", and/or characteristics. In many cases, local plug-in metadata 296 derives from manifest metadata stored in a manifest at an upgrade plug-in repository. Further details describing the manifest metadata are shown and described as pertaining to FIG. 3C.

Upgrade operation schedules 248 generated at schedule generator 232 are interpreted by plug-in service 234 to create various component instructions for issue to a selected set of management plug-ins. As shown, the instructions can be presented (e.g., using RESTful HTTP methods) to the management plug-ins in a structured object form (e.g., JSON) comprising parameters (e.g., example firmware instruction parameters 298) describing a target "node" for executing the instruction, a target plug-in "url", an operating system "environment" of the target plug-in, a "timestamp" indicating when the instruction is to be executed, a vendor-agnostic firmware "command" to be executed at the target plug-in, and/or other parameters.

A vendor-agnostic firmware command is a command that is not specific to any particular vendor, but is specific to a particular function to be performed with firmware. The vendor-agnostic firmware commands described herein (e.g., see Table 1) are a set of commands that are called or invoked to accomplish a particular vendor-agnostic function (e.g., upgrade, read, etc.) by translating a set of vendor-agnostic characteristics into vendor-specific characteristics. Once of the vendor-agnostic characteristics have been translated and/or normalized into vendor-specific characteristics, the vendor-supplied, vendor-specific components can be used to accomplish the particular vendor-agnostic function.

Descriptions of the shown vendor-agnostic firmware commands are presented in Table 1. Other commands are possible.

TABLE 1

Vendor-agnostic firmware commands

| Command | Description |
| --- | --- |
| detect( ) | Returns a list of detected component firmware update targets and associated versions; returned parameters include: compID: computer readable component identifier class: component class type: component type description: human readable component description version: current component firmware version count: count of component |
| upgrade(<args>) | Performs a firmware upgrade for specified components; no return |

TABLE 1-continued

Vendor-agnostic firmware commands

| Command | Description |
| --- | --- |
| | value; <args> include compID, type, and image |
| detect_dependent_comps( ) | Returns a list of components dependent on other components for firmware operations; examples include attached HDDs and SSDs; returned parameters include: depCompID: computer readable dependent component identifier model: dependent component model (passed to firmware management plug-ins) version: current dependent component firmware version |
| upgrade_dependent_comps (<arqs>) | Performs a firmware upgrade for specified dependent components; no return value; <args> include depCompID, type, and image |
| read( ) | Reads a firmware image object |

Figure 3A:
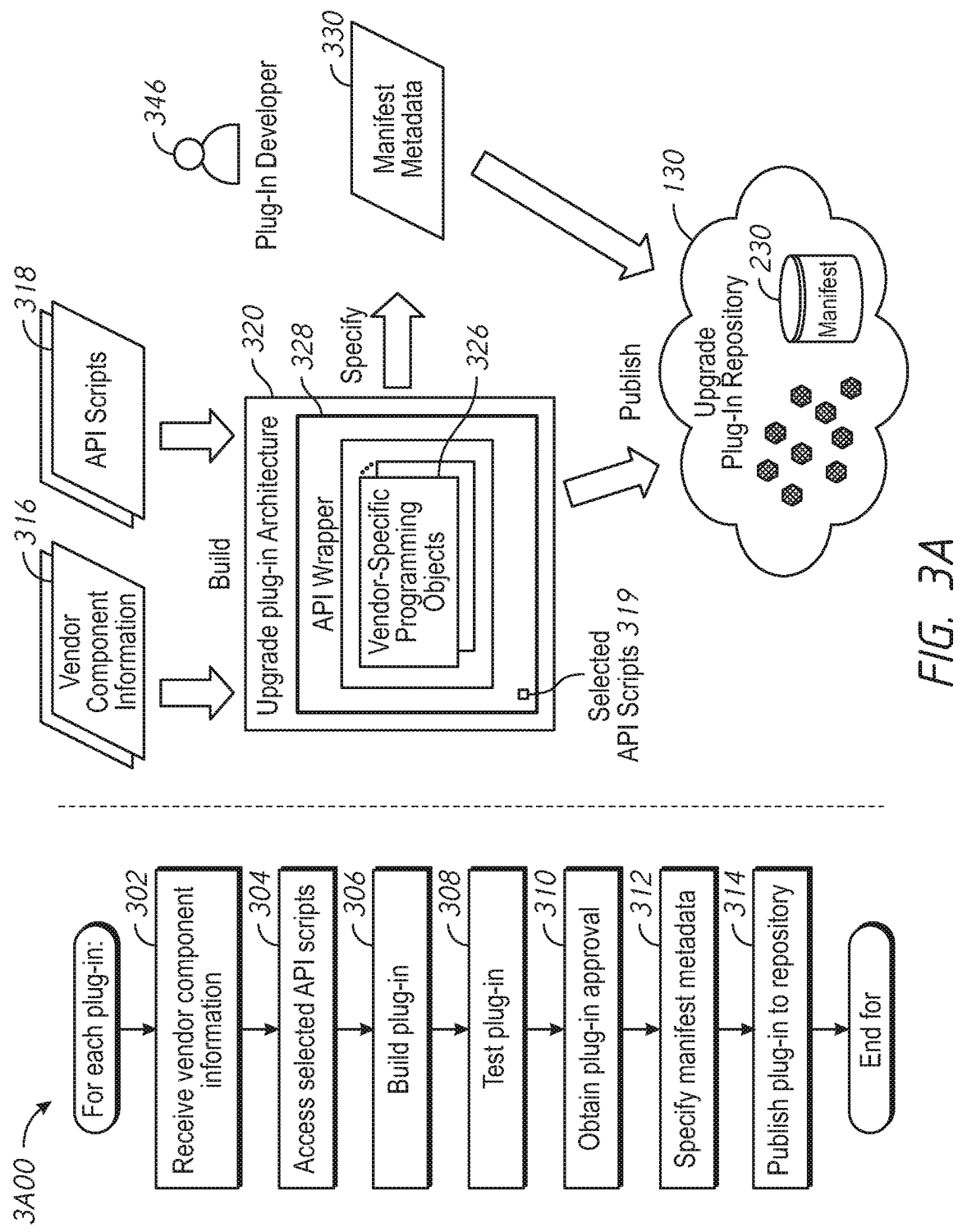
FIG. 3A depicts an upgrade management plug-in development technique as implemented in systems for managing upgrades in distributed computing systems, according to an embodiment.

A technique for developing the upgrade plug-ins as described herein is discussed as pertaining to FIG. 3A.

FIG. 3A depicts an upgrade plug-in development technique 3A00 as implemented in systems for managing upgrades, including multi-vendor firmware updates in distributed computing systems. As an option, one or more variations of upgrade plug-in development technique 3A00 or any aspect thereof may be implemented in the context of the architecture and functionality of the embodiments described herein. The upgrade plug-in development technique 3A00 or any aspect thereof may be implemented in any environment.

The embodiment shown in FIG. 3A is merely one example of a technique for developing and publishing upgrade plug-ins to facilitate various aspects of the herein disclosed techniques. Specifically, the upgrade plug-in development technique 3A00 depicts certain steps and/or operations that might be invoked by a plug-in developer 246 to build various component management modules. Such component management modules are built to comport with an upgrade plug-in architecture 320 (e.g., via a "build" operation). An upgrade module might specify a set of manifest metadata 330 characterizing the plug-ins (e.g., via a "specify" operation). Making upgrade modules available for use in the architecture includes loading (e.g., via a "publish" operation) the plug-ins and manifest metadata 330 to an upgrade plug-in repository 130, and exposing the loaded items for access. In some situations, a component module might merely specify a set of metadata characterizing its contents in terms of information subsumed by component module and/or supported mechanisms to securely access the information.

More specifically, for each upgrade plug-in, upgrade plug-in development technique 3A00 can commence with receiving certain information pertaining to the components (e.g., software and/or firmware components) that the plug-in will support (step 302). For example, vendor firmware information 316 might comprise certain vendor-specific programming objects (e.g., tools, commands, firmware images, etc.), version dependencies, operating system environment constraints, and/or other information pertaining to a given component and/or component type and/or component class. A set of API scripts 318 may also be accessed by the plug-in developer (step 304). API scripts 318 are sets of programming objects that may facilitate the abstraction of vendor-specific programming objects and/or information to vendor-agnostic programming objects and/or information according to the herein disclosed techniques. For example, API scripts 318 might comprise filters to assess whether a given plug-in can service a particular instruction from upgrade management agent $220_{11}$.

Using vendor component information 316, API scripts 318, and/or other information (e.g., custom "glue" programming code), plug-in developer 246 can build the plug-in (step 306). As shown, the resulting plug-in can take a form corresponding to upgrade plug-in architecture 320 comprising a set of vendor-specific programming objects 326 logically surrounded by an API wrapper 328 comprising selected API scripts 319 from the API scripts 318. In some embodiments, for example, the resulting plug-in can comprise a JSON structure with metadata information, including dependencies on various libraries and firmware objects (e.g., firmware images). In some cases, the plug-in can comprise custom programming objects (e.g., Python file) to, as an example, detect hardware components, collect component versions, and perform component upgrades. The plug-in can then be tested (step 308) and approved (step 310) for publishing. Prior to publishing, the portion of manifest metadata 330 corresponding to the newly developed plug-in is specified (step 312). When the plug-in is approved and the manifest metadata prepared, the plug-in and associated metadata can be published to upgrade plug-in repository 130 and manifest 230, respectively (step 314).

The upgrade plug-in development technique 3A00 and associated plug-in architecture can be applied to a wide variety of plug-ins developed to support a respective wide variety of component operations and/or purposes. Examples of various categories of component management plug-ins are shown and described as pertaining to FIG. 3B.

Figure 3B:
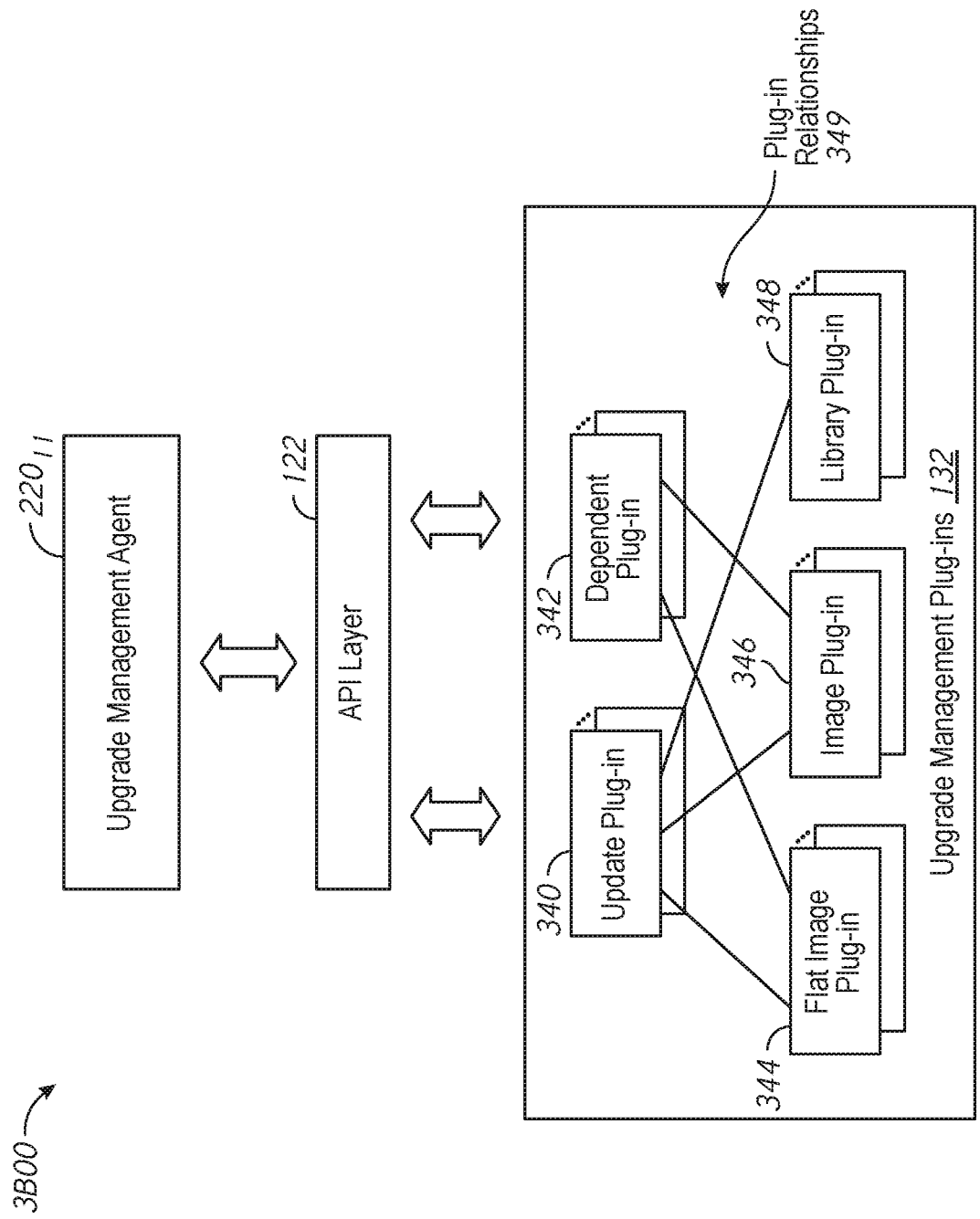
FIG. 3B presents a relationship diagram showing relationships between categories of upgrade management plug-ins as implemented in systems for managing upgrades including multi-vendor firmware updates in hyperconverged distributed computing systems, according to an embodiment.

FIG. 3B presents a relationship diagram 3B00 showing relationships between categories of upgrade plug-ins as implemented in systems for managing upgrades including multi-vendor firmware updates in distributed computing systems. As an option, one or more variations of relationship diagram 3B00 or any aspect thereof may be implemented in the context of the architecture and functionality of the embodiments described herein. The relationship diagram 3B00 or any aspect thereof may be implemented in any environment.

Specifically, FIG. 3B depicts one embodiment of various categories of upgrade plug-ins 132 that interact with upgrade management agent $220_{11}$ through API layer 122. A set of plug-in relationships 349 between upgrade plug-ins 132 are also shown. More specifically, one or more instances of an update plug-in 340 and/or one or more instances of a dependent plug-in 342 interact with upgrade management agent $220_{11}$. Other plug-ins, such as a flat image plug-in 344, an image plug-in 346, or a library plug-in 348 merely interact with the update plug-ins and/or the dependent plug-ins, as depicted by plug-in relationships 349.

In some embodiments, an update plug-in 340 is used to enumerate a specific set of components, including hardware, software, and/or firmware. An update plug-in 340 can further facilitate updating the components of a given computing system. In some cases, an update plug-in 340 can support multiple components types such as an SMC Gen 9 BIOS and an SMC Gen 10 BIOS. A dependent plug-in 342 is used for tracking and updating components performed with assistance from another update plug-in. As an example, a dependent plug-in might be used to manage disk (e.g., HDD, SSD, etc.) firmware and/or other component (e.g., SAS expanders, etc.) firmware. In this case, dependent plug-in 342 provides an instance of an update plug-in 340 associated with an HDD host bus adapter (HBA), the update instructions, and a component (e.g., firmware and/or software) image or images.

A library plug-in 348 contains certain programming objects providing associated functionality shared by multiple plug-ins. For example, a library plug-in 348 might comprise Python modules and binaries used to detect versions and perform upgrades. Other library plug-ins might be used to store and/or operate vendor-specific programming objects (e.g., tools). Library plug-ins can be made available at all times or for specific purposes (e.g., upgrades only). An image plug-in 346 contains and/or provides firmware update images. As an example, an image plug-in 346 might receive the component type and target version and return an opened file-like object that can be accessed with a read ( ) command. A flat image plug-in 344 facilitates extraction of single uncompressed firmware image files (e.g., "plain images") by upgrade management agent $220_{11}$.

The discussion of the foregoing embodiment is merely one embodiment that includes API access to specific plug-in relationships. However, the shown API layer can include access to multiple sets of vendor information, and/or multiple classifications of vendors and/or their vendor-specific information and/or vendor inter-relationships. Strictly as one example, there might be a hierarchy of vendors listed in a hierarchy and/or tagged or classified to enforce that all firmware from one vendor is to be applied before any firmware from another vendor is applied. Any API access syntax and any data structure can be used to facilitate efficient operation of the upgrade management agent.

Figure 3C:
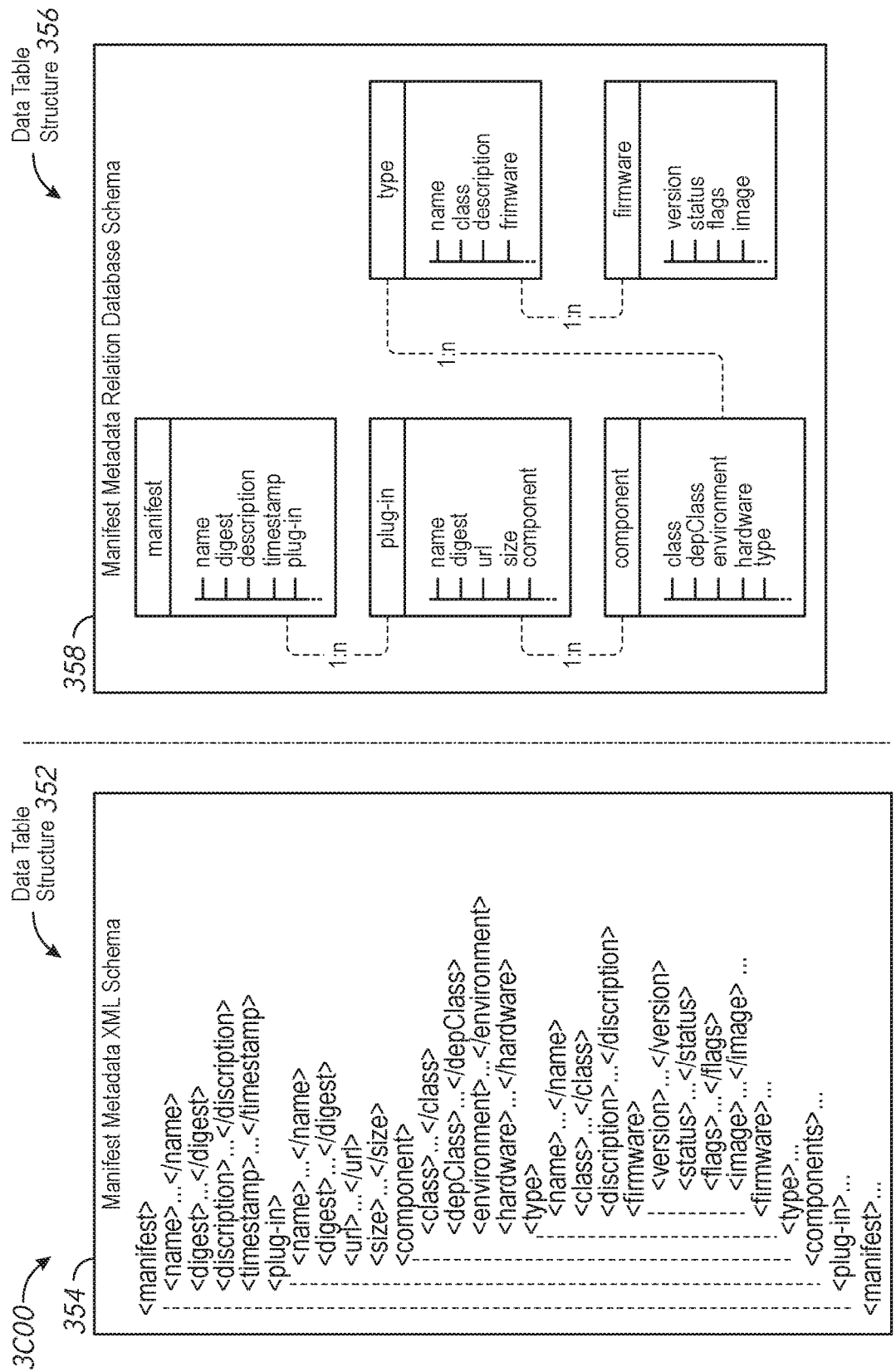
FIG. 3C depicts examples of metadata schema for storing plug-in manifest metadata in systems for managing upgrades including multi-vendor firmware updates in distributed computing systems, according to an embodiment.

Examples of data structures for storing the manifest metadata describing the foregoing plug-ins and other information are shown and described as pertaining to FIG. 3C.

FIG. 3C depicts examples of metadata schema 3C00 for storing plug-in manifest metadata in systems for managing upgrades including multi-vendor firmware updates in distributed computing systems. As an option, one or more variations of metadata schema 3C00 or any aspect thereof may be implemented in the context of the architecture and functionality of the embodiments described herein. The metadata schema 3C00 or any aspect thereof may be implemented in any environment.

The schema shown in FIG. 3C are merely examples of possible data structures for storing the metadata associated with the upgrade plug-in repository manifest as described herein. Specifically, a data file structure 352 characterized by a manifest metadata XML schema 354 and a data table structure 356 characterized by a manifest metadata relational database schema 358 are shown. As can be observed in manifest metadata XML schema 354, the manifest metadata can comprise multiple hierarchical tag levels. For example, representative tag levels corresponding to a <manifest>, a <plug-in>, a <component>, a <type>, and <firmware> are shown. Other tags and/or levels are possible. Each parent tag level can have a one-to-many relationship with a child tag level. For example, a given <plug-in> can be associated with multiple components described by respective instance of a <component> . . . </component> section. Representative attribute tags associated with each tag level are also shown. Other attribute tags are possible.

As further shown in manifest metadata relational database schema 358, the manifest metadata can comprise multiple data tables related by various keys. For example, representative data tables corresponding to a manifest, a plug-in, a component, a type, and firmware are shown. Other data partitioning and/or tables are possible. Each parent table can have a one-to-many relationship with a child table. For example, a given entry in the plug-in table can be associated (e.g., by a component key) with multiple entries in the component table. Representative attribute columns within each data table are also shown. Other attribute columns are possible.

Figure 3D:
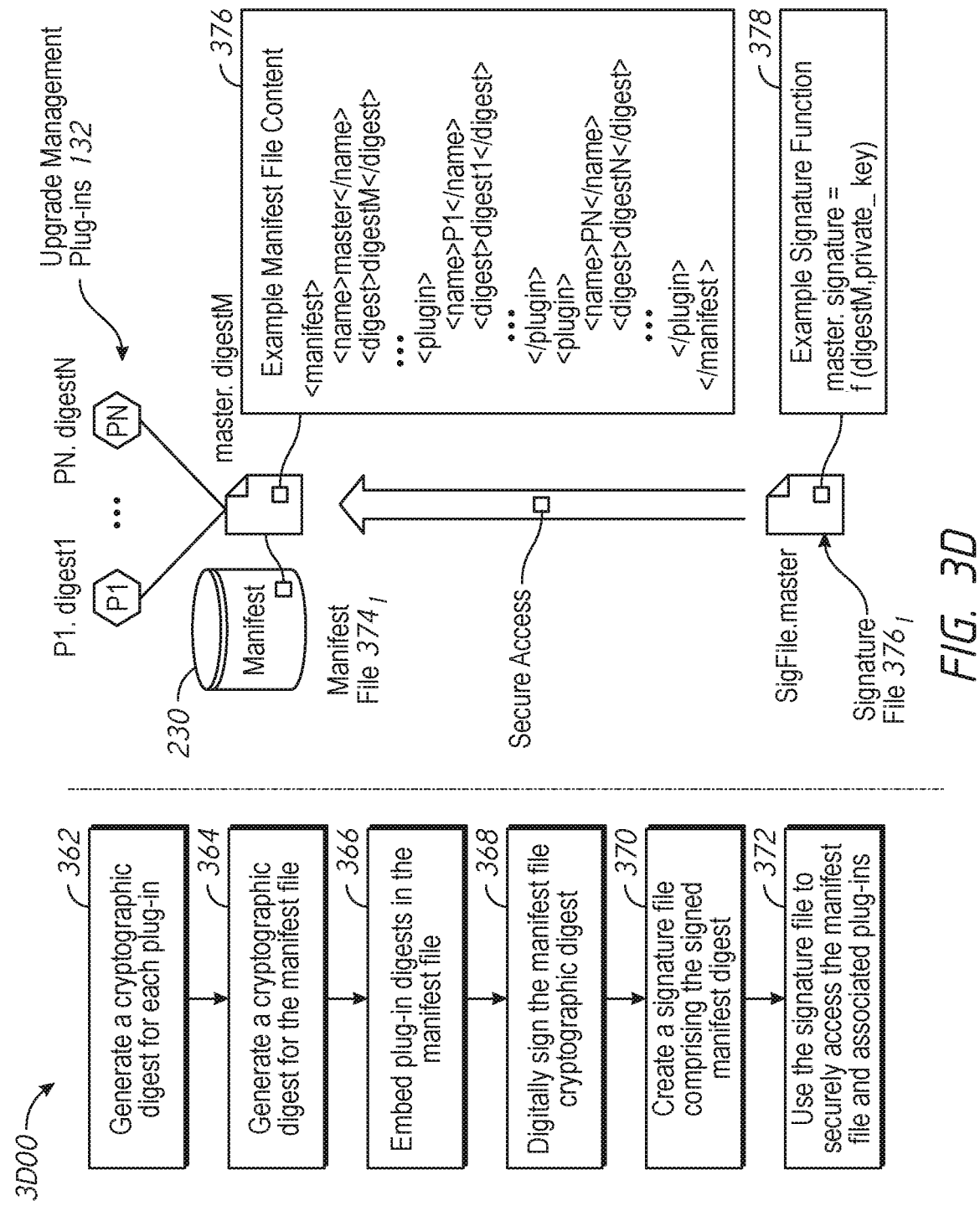
FIG. 3D presents a plug-in repository security technique for securely storing and accessing upgrade management plug-ins in systems for managing upgrades including multi-vendor firmware updates in distributed computing systems, according to an embodiment.

Certain structures (e.g., tags, fields, etc.) in the foregoing schema can be used to facilitate upgrade plug-in repository security as shown and described as pertaining to FIG. 3D.

FIG. 3D presents a plug-in repository security technique 3D00 for securely storing and accessing upgrade plug-ins in systems for managing upgrades including multi-vendor firmware updates in distributed computing systems. As an option, one or more variations of plug-in repository security technique 3D00 or any aspect thereof may be implemented in the context of the architecture and functionality of the embodiments described herein. The plug-in repository security technique 3D00 or any aspect thereof may be implemented in any environment.

The embodiment shown in FIG. 3D is merely one example of a technique for securely publishing upgrade plug-ins to facilitate various aspects of the herein disclosed techniques. Specifically, the plug-in repository security technique 3D00 depicts certain steps and/or operations that might be invoked when publishing a set of upgrade plug-ins 132 (e.g., P1, . . . , PN) described by a manifest file $374_1$ in a manifest 230 stored in an upgrade plug-in repository.

Plug-in repository security technique 3D00 can commence by generating a cryptographic digest for each plug-in (step 362). A cryptographic digest is a digital summary of information used to uniquely and securely identify the information and integrity of the information. Such digests are often generated by applying a hash function (e.g., SHA-1, MD5, etc.) to the information to generate a low-collision, high-security (e.g., 160-bit) digest. For example, a hash function can be applied to plug-ins P1 and P2 to generate digests represented by "digest1" and "digestN", respectively. In some cases, and as shown, the plug-in names (e.g., P1.digest1 and PN.digestN) might comprise a digest suffix. A digest (e.g., represented as "digestM") for manifest file $374_1$ can also be generated (step 364). The manifest file might then be named "master.digestM". One aspect of cryptographic digest implementations as used herein is the inclusion of mathematical "trap-door" functions that make it computationally hard to derive the input from the output. This aspect is used in the disclosed embodiments so as to make it very difficult to change the distributed bits without the digest changing as well.

The digests for the plug-ins recorded in the manifest file are embedded in manifest file (step 366). For example, and as shown in example manifest file content 376, "digest1" and "digestN" are recorded in manifest file $374_1$. The manifest file cryptographic digest (e.g., "digestM") is then digitally signed (step 368) and recorded in a signature file (step 370). Digitally signing the digest might comprise hashing the manifest digest with a private key so as to allow decryption by an associated public key. For example, a signature file $376_1$ (e.g., named "sigFile.master") can be created with an entry corresponding to the digitally signed manifest file digest (e.g., "master.signature") generated as a function of "digestM" and a "private_key" (e.g., example signature function 378). Signature file $376_1$ can then be used to validate the authorship of the manifest file and associated plug-ins (step 372). In some cases, the plug-in repository security technique 3D00 can facilitate discovery and/or prevention of corruption of the repository plug-ins on the storage media and/or during transport (e.g., malicious software injection) to the repository.

Figure 3E:
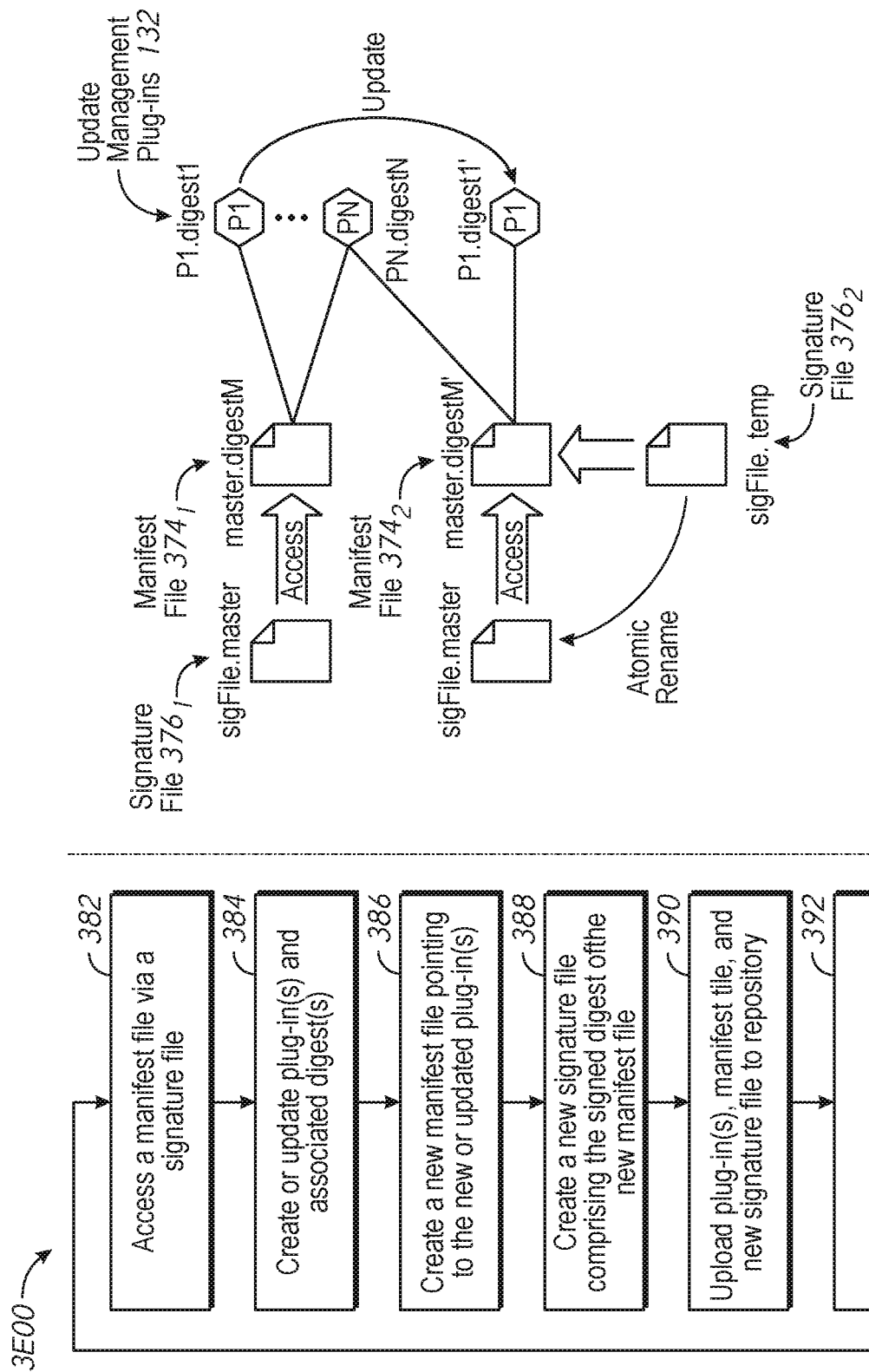
FIG. 3E illustrates an atomic publication technique for publishing shared upgrade management plug-ins in systems for managing upgrades including multi-vendor firmware updates in distributed computing systems, according to an embodiment.

Certain aspects of the plug-in repository security technique 3D00 further facilitate atomic updates to the plug-in repository as shown and described as pertaining to FIG. 3E.

Atomic Publication Technique to Avoid Access Conflicts

FIG. 3E illustrates an atomic publication technique 3E00 for publishing shared upgrade plug-ins in systems for managing upgrades including multi-vendor firmware updates in distributed computing systems. As an option, one or more variations of atomic publication technique 3E00 or any aspect thereof may be implemented in the context of the architecture and functionality of the embodiments described herein. The atomic publication technique 3E00 or any aspect thereof may be implemented in any environment.

The atomic publication technique 3E00 shown in FIG. 3E depicts various steps and/or operations associated with publishing upgrade plug-ins using atomic operations so as to manage collisions and/or conflicts associated with accessing the plug-ins according to the herein disclosed techniques. Specifically, atomic publication technique 3E00 can commence with accessing a then-current manifest file (e.g., manifest file $374_1$) named "master.digestM" using a then-current signature file (e.g., signature file $376_1$) named "sigFile.master" (step 382). As shown, "master.digestM" points to various upgrade plug-ins (e.g., upgrade plug-ins 132), such as plug-in P1 and plug-in PN. Over the course of time, certain other plug-ins might be created and/or updated (step 384). For example, and as can be observed, plug-in P1 might be updated to result in a plug-in P1'. A new manifest file (e.g., manifest file $374_2$) pointing to the plug-in P1' and other newly created and/or updated plug-ins is created (step 386). A new signature file (e.g., signature file $376_2$) comprising the digitally signed digest (e.g., "digestM"') of the manifest file $374_2$ is also created (step 388).

The new and/or updated plug-ins, new manifest file, and new signature file are then uploaded to the repository (step 390). As shown, access to any new and/or updated plug-ins is through the new manifest file which, in turn, is accessed through the new signature file. Further, the new signature file is given a name suffix (e.g., ".temp") so as to control access to the new content in the repository. Specifically, certain in-process firmware operations will continue to access the manifest file $374_1$ through signature file "sigFile.master" to perform those operations.

Access to new and/or updated plug-ins during execution of certain upgrade operations may introduce negative results (e.g., conflicting component versions, operating environments, etc.). The atomic publication technique 3E00 addresses such issues by performing an atomic rename of the new signature file (step 392), overwriting the previous signature file, while contemporaneously updating the master digest in an atomic manner. For example, and as shown, signature file $376_2$ is renamed from "sigFile.temp" to "sigFile.master" using an atomic operation. This atomic operation overwrites the previously-existing "sigFile.master" such that the contents of the 'old' signature file $376_1$ is no longer available for use. Instead, the 'new' signature from signature file $376_2$ is used. This technique has the property that any currently-in-progress upgrade operations are not affected by the atomic operation.

In some cases, certain upgrade operations and/or other operations might be quiesced before performing the atomic rename. Following the atomic rename, component operations can access the new instance of manifest file $374_2$ that includes the new and/or updated plug-ins (e.g., plug-in P1') through signature file $376_2$ (e.g., now named "sigFile.master"). This technique facilitates processes for asynchronously updating large plug-in files while always managing the repository so as to serve a consistent view of repository contents.

Figure 4:
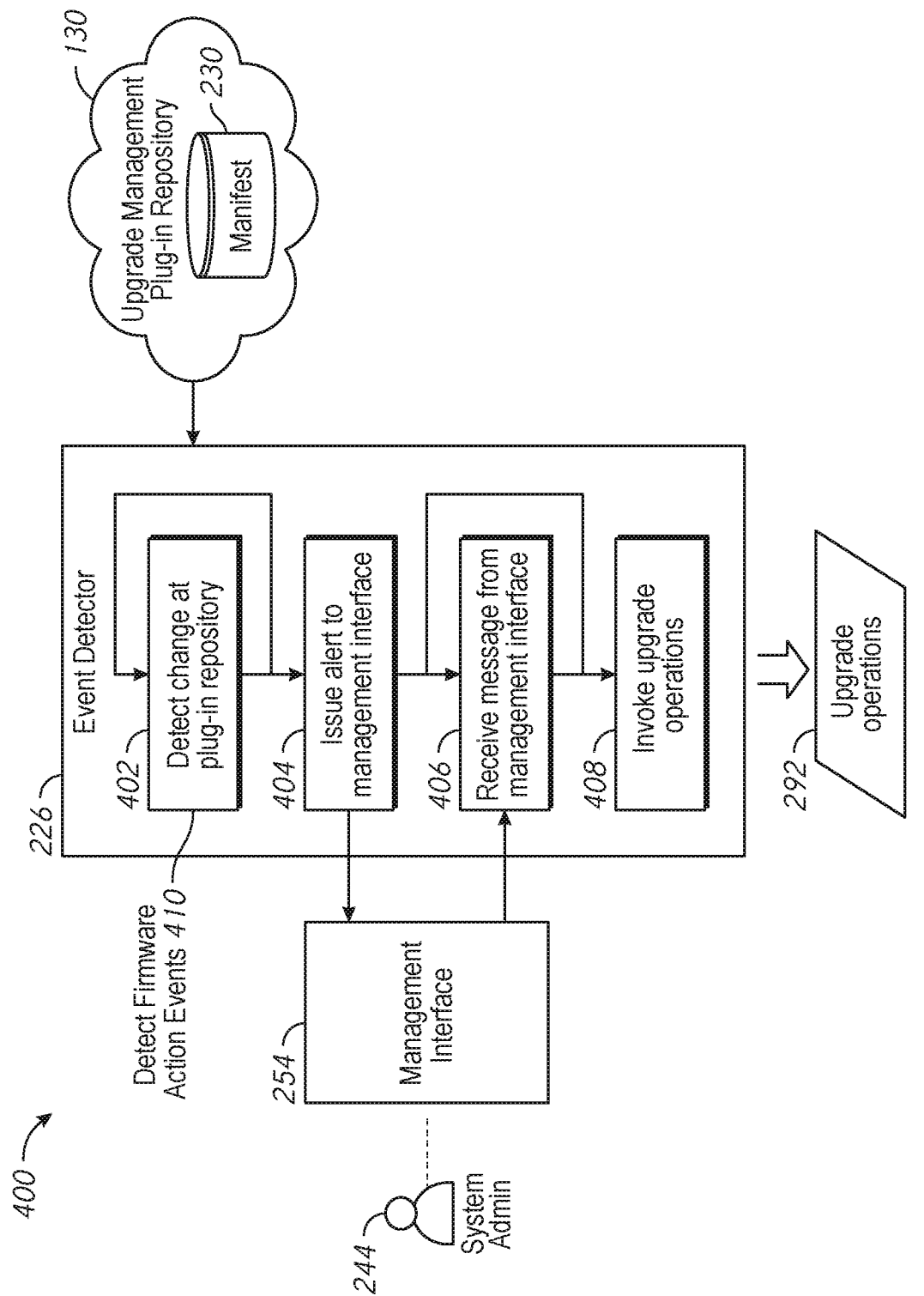
FIG. 4 depicts a firmware event detection technique as implemented in systems for managing upgrades including multi-vendor firmware updates in distributed computing systems, according to an embodiment.

In some cases, changes to the upgrade plug-in repository can be detected to trigger certain component operations, as shown and described as pertaining to FIG. 4.

FIG. 4 depicts an event detection technique 400 as implemented in systems for managing upgrades including multi-vendor firmware updates in distributed computing systems. As an option, one or more variations of event detection technique 400 or any aspect thereof may be implemented in the context of the architecture and functionality of the embodiments described herein. The event detection technique 400 or any aspect thereof may be implemented in any environment.

The embodiment shown in FIG. 4 is merely one example of certain steps and/or operations to detect component action events (see grouping 410) as implemented in systems for managing upgrades including multi-vendor firmware updates in distributed computing systems. Specifically, the event detection technique 400 facilitated by event detector 226 earlier described can commence with detecting a change at a upgrade plug-in repository (step 402). For example, event detector 226 might continually listen for changes to the plug-ins and/or manifest 230 at upgrade plug-in repository 130. Responsive to any detected repository changes, an alert is issued to, for example, management interface 254 (step 404).

As an example, a new component version available at the repository might precipitate an alert recommending an upgrade to the new version. A user (e.g., system admin 244) at management interface 254 can respond to the alert by, for example, authorizing the update to the new version. In some cases, system admin 244 can initiate an upgrade operation (e.g., enumeration, update, etc.) with no alert. In either case, event detector 226 can receive such messages from management interface 254 (step 406) and invoke a corresponding set of component operations (e.g., upgrade operations 292, which may be firmware operations) to be executed according to the herein disclosed techniques (step 408).

Figure 5:
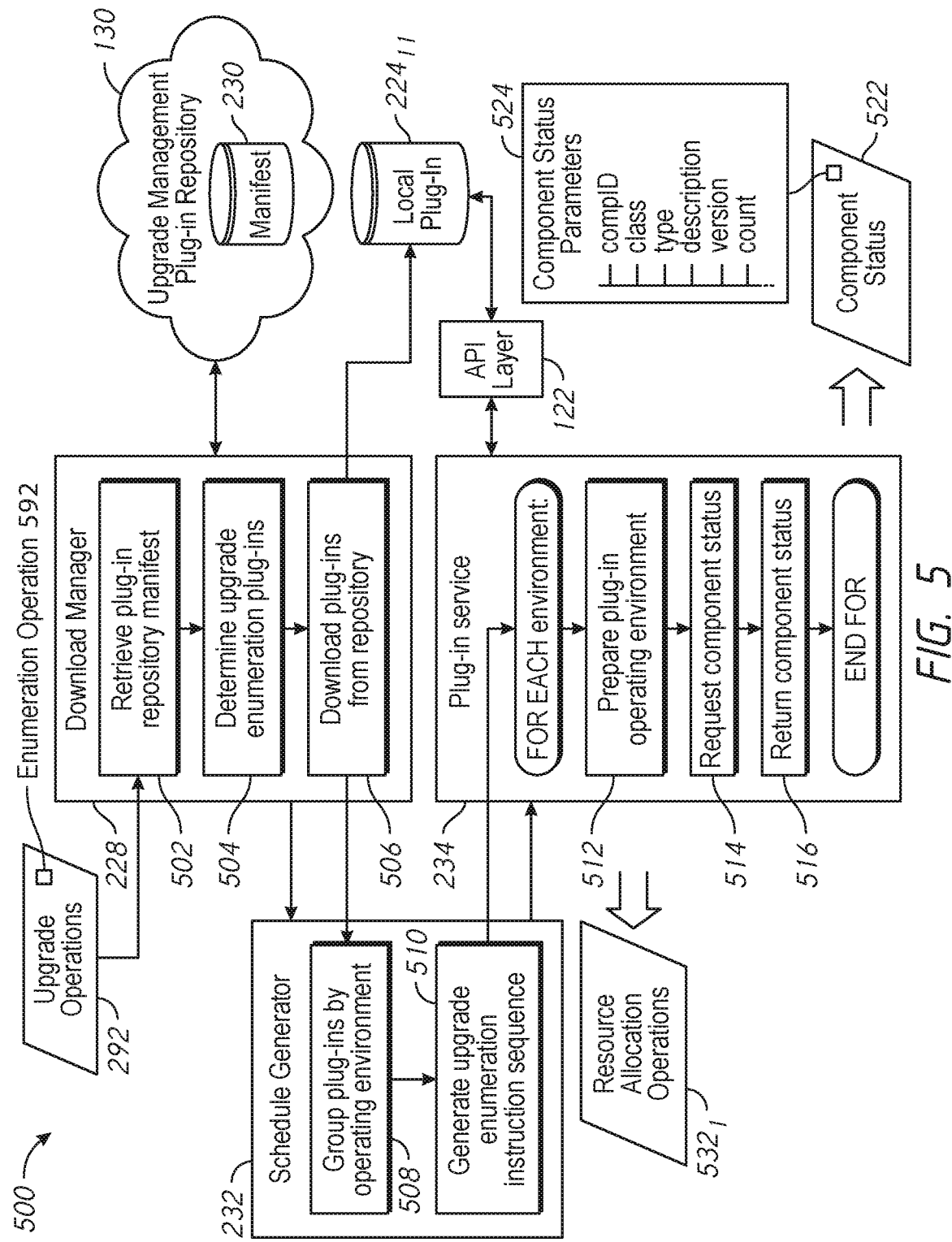
FIG. 5 illustrates an upgrade status analysis technique as implemented in systems for managing upgrades including multi-vendor firmware updates in distributed computing systems, according to an embodiment.
Figure 6:
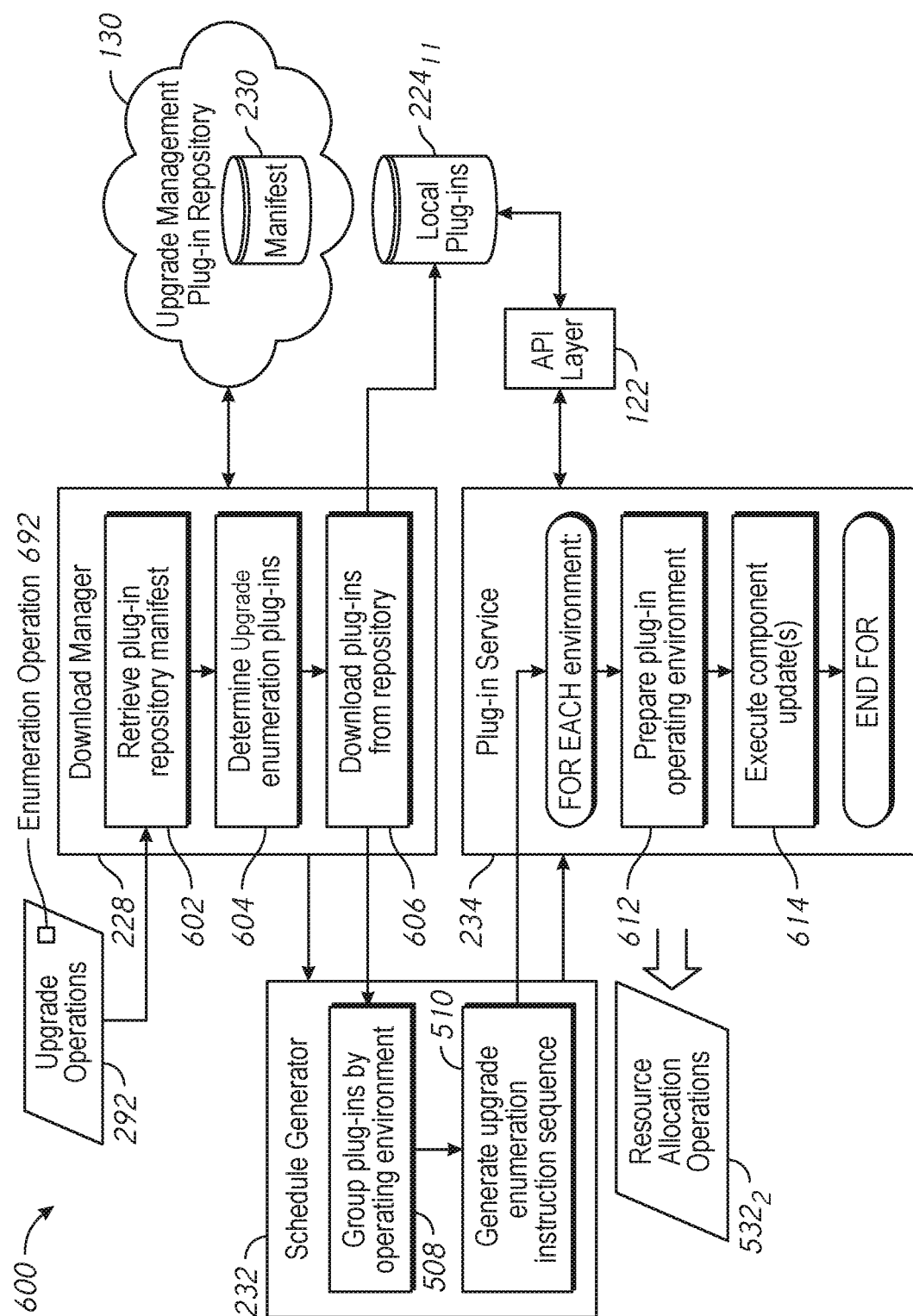
FIG. 6 depicts an upgrade technique as implemented in systems for managing upgrades including multi-vendor firmware updates in distributed computing systems, according to an embodiment.

Techniques for processing such component operations are shown and described as pertaining to FIG. 5 and FIG. 6.

FIG. 5 illustrates a component status analysis technique 500 as implemented in systems for managing upgrades including multi-vendor firmware updates in distributed computing systems. As an option, one or more variations of component status analysis technique 500 or any aspect thereof may be implemented in the context of the architecture and functionality of the embodiments described herein. The component status analysis technique 500 or any aspect thereof may be implemented in any environment.

The embodiment shown in FIG. 5 is merely one example of certain steps and/or operations to analyze (e.g., enumerate) the component status of various components in distributed computing systems. Specifically, an enumeration operation 592 from a set of upgrade operations 292 presented to a download manager 228 can invoke a retrieval of the then-current manifest from an upgrade plug-in repository (step 502). For example, download manager 228 can retrieve the manifest 230 from upgrade plug-in repository 130. Based at least in part on the parameters associated with enumeration operation 592, a set of upgrade plug-ins are determined (step 504) (e.g., a group of upgrades) and downloaded from the repository (step 506).

At schedule generator 232, the downloaded enumeration plug-ins (e.g., local plug-ins $224_{11}$) are grouped, for example, by the operating system environment corresponding to each plug-in (step 508). The operating system environment is merely one possible grouping criteria to facilitate efficient execution of the enumeration operations. Other grouping criteria and/or objectives are possible. The schedule generator 232 further generates a component operation schedule comprising a sequence of component enumeration instructions (step 510). Various techniques disclosed herein can be applied to generate the instruction sequence.

A plug-in service 234 executes the component enumeration instruction sequence (e.g., component operation schedule) provided by schedule generator 232. As can be observed, the instruction sequence can also be grouped, for example, by the plug-in operating system environment, or other aspect. In this case, for each identified plug-in environment, the selected environment is prepared for running the corresponding plug-ins (step 512). In some cases, preparing the environment may comprise invoking various resource allocation operations 5321, such as migrating one or more VMs and/or containers between nodes. When the plug-in environment is prepared, plug-in service can issue messages to the local plug-ins 2241 through API layer 122 to request component status (step 514). The plug-ins respond by returning the component status to plug-in service 234 (step 516). For example, component status 522 can include a set of component status parameters 524 comprising, for example, a component identifier or compID, a component class, a component type, a component description, a component firmware version, a component software version, a count of the component, and/or other parameters.

FIG. 6 depicts a update technique 600 as implemented in systems for managing upgrades including multi-vendor firmware updates in distributed computing systems. As an option, one or more variations of update technique 600 or any aspect thereof may be implemented in the context of the architecture and functionality of the embodiments described herein. The update technique 600 or any aspect thereof may be implemented in any environment.

The embodiment shown in FIG. 6 is merely one example of certain steps and/or operations to update components in distributed computing systems. Specifically, an update operation 692 from a set of update operations 292 presented to a download manager 228 can invoke a retrieval of the then-current manifest from a plug-in repository (step 602). For example, download manager 228 can retrieve the manifest 230 from plug-in repository 130. Based at least in part on the parameters associated with update operation 692, a set of update plug-ins are determined (step 604) and downloaded from the repository (step 606).

At a schedule generator 232, downloaded upgrade plug-ins (e.g., local plug-ins 224$_{11}$) are grouped, for example, by the operation system environment corresponding to each plug-in (step 608). The operating system environment is merely one possible grouping criteria to facilitate efficient execution of the update operations. Other grouping criteria and/or objectives are possible. In some examples, the plug-ins may be grouped by state changes used to install the plug-in and/or update corresponding to the plug-in. Schedule generator 232 further generates an upgrade operation schedule comprising a sequence of update instructions (step 610). Various techniques disclosed herein can be applied to generate the instruction sequence.

A plug-in service 234 executes the update instruction sequence (e.g., component operation schedule) provided by schedule generator 232. As can be observed, the instruction sequence can also be grouped, for example, by the plug-in operating system environment. In this case, for each identified plug-in environment, the selected environment is prepared for running the corresponding plug-ins (step 612). In some cases, preparing the environment may comprise invoking various resource allocation operations 532$_2$, such as migrating one or more VMs and/or containers between nodes. When the plug-in environment is prepared, the plug-in service can issue messages to local plug-ins 224$_{11}$ through the API layer 122 to execute one or more firmware updates (step 614).

Figure 7:
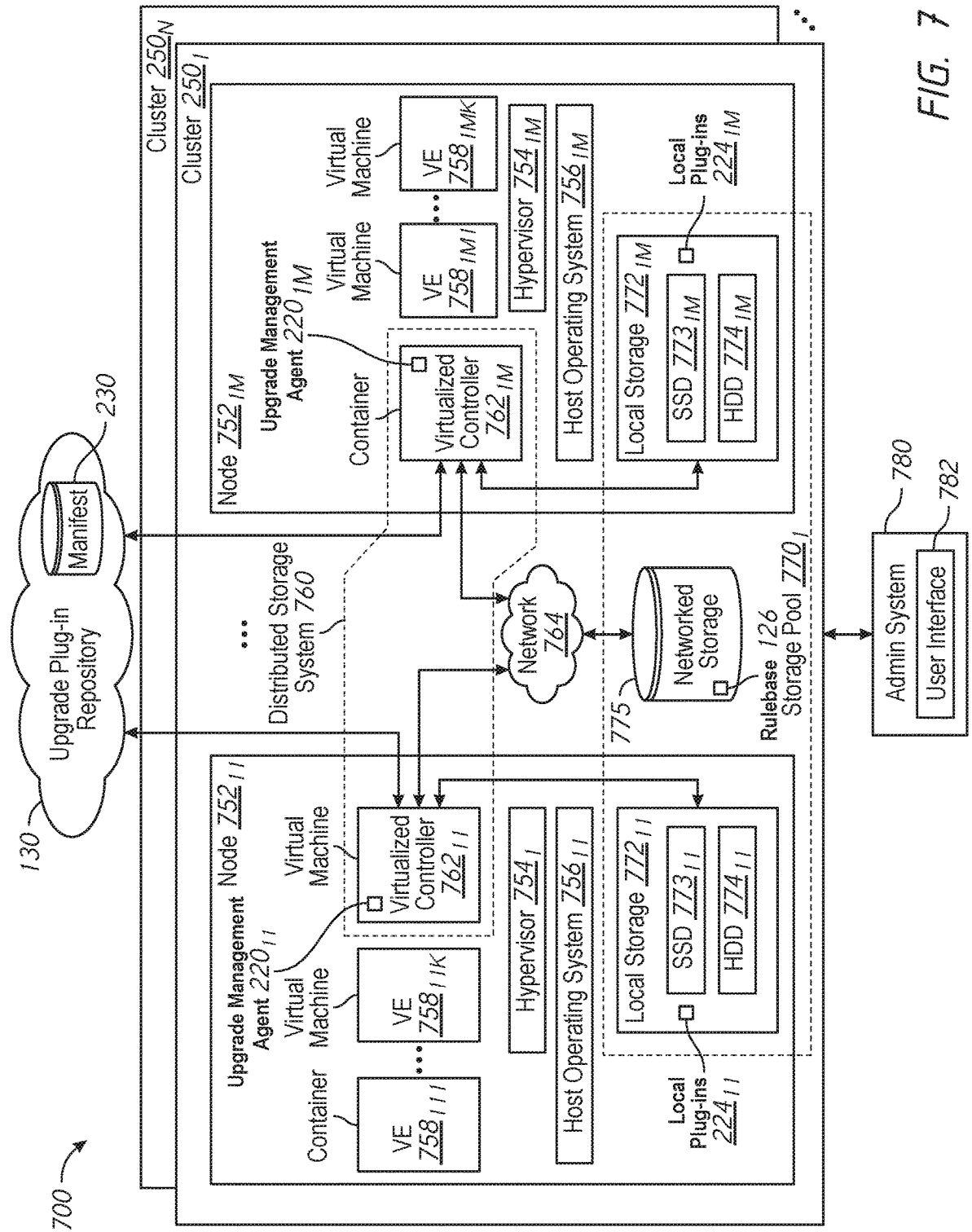
FIG. 7 depicts a distributed virtualization environment in which embodiments of the present disclosure can operate.

One embodiment of an environment for implementing any of the herein disclosed techniques is shown and described as pertaining to FIG. 7.

FIG. 7 depicts a distributed virtualization environment 700 in which embodiments of the present disclosure can operate. As an option, one or more variations of distributed virtualization environment 700 or any aspect thereof may be implemented in the context of the architecture and functionality of the embodiments described herein.

The shown distributed virtualization environment depicts various components associated with one instance of a distributed virtualization system (e.g., distributed computing system) comprising a distributed storage system 760 that can be used to implement the herein disclosed techniques. Specifically, the distributed virtualization environment 700 comprises multiple clusters (e.g., cluster 250$_1$, . . . , cluster 250$_N$) comprising multiple nodes that have multiple tiers of storage in a storage pool. Representative nodes (e.g., node 252$_{11}$, . . . , node 252$_{1M}$) and storage pool 770$_1$ associated with cluster 250$_1$ are shown. Each node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage 772$_{11}$, . . . , local storage 772$_{1M}$). For example, the local storage can be within or directly attached to a server and/or appliance associated with the nodes. Such local storage can include solid state drives (SSD 773$_{11}$, . . . , SSD 773$_{1M}$), hard disk drives (HDD 774$_{11}$, . . . , HDD 774$_{1M}$), and/or other storage devices.

As shown, the nodes in distributed virtualization environment 700 can implement one or more user virtualized entities (e.g., VE 758$_{111}$, . . . , VE 758$_{11K}$, . . . , VE 758$_{1M1}$, . . . , VE 758$_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system 756$_{11}$, . . . , host operating system 756$_{1M}$), while the VMs run multiple applications on various respective guest operating systems. Such flexibility can be facilitated at least in part by a hypervisor (e.g., hypervisor 754$_{11}$, . . . , hypervisor 754$_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.)

that are isolated from the node host computer and other containers. Such containers directly interface with the kernel of the host operating system (e.g., host operating system $756_{11}, \ldots$, host operating system $756_{1M}$) without, in most cases, a hypervisor layer. This lightweight implementation can facilitate efficient distribution of certain software components, such as applications or services (e.g., micro-services). As shown, distributed virtualization environment 700 can implement both a hypervisor-assisted virtualization environment and a container virtualization environment for various purposes.

Distributed virtualization environment 700 also comprises at least one instance of a virtualized controller (e.g., resource controller) to facilitate access to storage pool $770_1$ by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a hypervisor).

Multiple instances of such virtualized controllers can coordinate within a cluster to form the distributed storage system 760 which can, among other operations, manage the storage pool $770_1$. This architecture further facilitates efficient scaling of the distributed virtualization system. The foregoing virtualized controllers can be implemented in distributed virtualization environment 700 using various techniques. Specifically, an instance of a virtual machine at a given node can be used as a virtualized controller in a hypervisor-assisted virtualization environment to manage storage and I/O activities. In this case, for example, the virtualized entities at node $252_{11}$ can interface with a controller virtual machine (e.g., virtualized controller $762_{11}$) through hypervisor $754_{11}$ to access the storage pool $770_1$. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760.

For example, a hypervisor at one node in the distributed storage system 760 might correspond to VMware ESXi software, and a hypervisor at another node in the distributed storage system 760 might correspond to Nutanix AHV software. As another virtualized controller implementation example, containers (e.g., Docker containers) can be used to implement a virtualized controller (e.g., virtualized controller $762_{1M}$) in an operating system virtualization environment at a given node. In this case, for example, the virtualized entities at node $252_{1M}$ can access the storage pool $770_1$ by interfacing with a controller container (e.g., virtualized controller $762_{1M}$) through hypervisor $754_{1M}$ and/or the kernel of host operating system $756_{1M}$.

In certain embodiments, one or more instances of an upgrade management agent can be implemented in the distributed storage system 760 to facilitate the herein disclosed techniques. Specifically, upgrade management agent $220_{11}$ can be implemented in the virtualized controller $762_{11}$, and upgrade management agent $220_{1M}$ can be implemented in the virtualized controller $762_{1M}$. Such instances of the upgrade management agent and/or virtualized controller can be implemented in any node in any cluster. Actions taken by one or more instances of the upgrade management agent and/or virtualized controller can apply to a node (or between nodes), and/or to a cluster (or between clusters), and/or between any resources or subsystems accessible by the virtualized controller or their agents (e.g., upgrade management agent). In certain other architectures, the upgrade management agent $220_{11}$ can be implemented in any one or more virtual machines, or in any one or more virtualized container or in other process.

As further shown, the upgrade plug-in repository 130 and manifest 230 can be accessed at the various instances of the virtualized controllers in the distributed storage system 760. Upgrade plug-ins from the upgrade plug-in repository 130 can also be stored in various storage facilities in the storage pool $770_1$. As an example, one set of local plug-ins $224_{11}$ might be stored at local storage $772_{11}$ and another set of local plug-ins $224_{1M}$ might be stored at local storage $772_{1M}$. The downloaded local plug-ins can run in various operating system environments in the distributed virtualization environment 700. In some cases, the plug-ins can run in the virtualized controller (e.g., at the same node). In other cases, the plug-ins run in the local hypervisor, which can serve to minimize disruption of resource availability during certain component operations (e.g., updates). In yet other cases, the host node might be booted into a special (e.g., Linux-based) operating system environment to run one or more of the upgrade plug-ins. In this cases, the special environment can be loaded into local storage and/or local memory (e.g., at the virtualized controller) so as to reduce and/or eliminate dependencies on any components accessed by the component operations.

The particular resources in the distributed virtualization environment 700 selected to host the upgrade management agents, local plug-ins, and/or other resource consumers related to the herein disclosed techniques might be determined based on the rulebase 126 (e.g., resource rule attributes, firmware version rule attributes, etc.) stored in the networked storage 775 and/or resource usage attributes collected at the virtualized controllers.

In some examples, an admin system 780 may be in communication with one or more of the nodes and/or clusters of the virtualized computing environment 700. The admin system 780 may be implemented, for example, using one or more computing devices (e.g., server, desktop, laptop, tablet, smart phone, etc. having one or more processors and memory encoded with executable instructions for causing the admin system 780 to perform the actions described herein). In some examples, the admin system 780 may include all or portions of an upgrade management agent described herein, such that identification of component versions, selection of upgrade group(s), and/or scheduling of upgrades may be performed by the admin system 780 in some examples. This may facilitate a schedule of upgrades, for example, across multiple clusters in the virtualized computing environment 700. In some examples, the admin system 780 may present a user interface 780, such as on a display. The user interface 780 may receive input from one or more users (e.g., system admins) to facilitate upgrade management as described herein and present a view of the progress and/or status of the upgrade management.

In some examples, the user interface 782 may display available upgrades (e.g., selected ones of the upgrades in the upgrade plug-in repository 130) based on the current versions of components in the virtualized computing environment 700 identified by one or more upgrade management agents. A user (e.g., a system admin and/or another computing process) may indicate selected ones of the available upgrades for installation (e.g., by clicking, highlighting, touching a screen, typing, or other indication mechanism). Upgrade management agents herein may schedule installation of upgrades responsive to the indication of selected upgrades for installation.

During operation, one or multiple of the upgrade management agents (e.g., a lead upgrade management agent, such as the upgrade management agent $220ii$ in some examples may detect current versions of multiple components in a computing system (e.g., in distributed virtualization environment 700). For example, upgrade management agent $220_{11}$ may detect current versions of software and/or firmware components of the computing system, including the hypervisor(s), operating system(s), and/or firmware used in the storage pool or on one or more of the nodes. In some examples, the upgrade management agent $220_{11}$ may interact with one or more upgrade plug-ins (e.g., firmware upgrade plug-ins) through an abstraction layer described herein, wherein the abstraction layer translates one or more vendor-agnostic firmware messages to one or more vendor-specific firmware operations a firmware component.

The upgrade management agent, such as the upgrade management agent $220_{11}$ may access an inventory of available updates (e.g., the upgrade plug-in repository 130) and may compare the available updates with the current version of components in the computing system. The upgrade management agent may then obtain (e.g., identify, download, access, and/or send to one or more other nodes) a group of updates based on the current versions of the multiple components. For example, the group of updates may include updates relevant to the computing system—e.g., updates which pertain to more recent versions of components used by the computing system. In some examples, the upgrade management agent may cause the updates relevant to a particular node (e.g., pertaining to more recent versions of components at that node) to be downloaded to the node. For example, the upgrade management agent $220_{11}$ may cause multiple nodes to obtain the modules (e.g., plug-ins) for upgrades of components at that node (e.g., local plug-ins $224_{11}$ at node $752_{11}$).

The upgrade management agent $220_{11}$ may schedule installation of the group of updates including grouping together installation of selected ones of the group of updates for a particular computing node of the multiple computing nodes that utilize a particular state change of the computing node during the installation. For example, the schedule may specify that upgrade for a particular node which utilize a boot into a different operating environment may occur together, reducing the occurrence of and/or avoiding booting multiple times into the different operating environment. In some examples, the schedule may specify that the upgrades be installed in a rolling fashion among multiple computing nodes (e.g., first at node $752_{11}$, then at $752_{12}$, . . . . Then at $752_{1M}$). In this manner, fewer than all the multiple computing nodes at a time may be unavailable due to upgrade. In some examples, scheduling the upgrades to occur in a rolling fashion may include scheduling at least a portion of the nodes to upgrade in parallel.

In some examples, the computing system (e.g., the distributed virtualization environment 700) may include multiple clusters—e.g., cluster $250_1$ . . . $250_N$. The upgrade management agent $220_{11}$ may in some examples identify versions of components and schedule upgrades across multiple clusters. In some examples, an upgrade management agent may be provided in a node or other computing device which may be external to one or more of the clusters, for example, in admin system 780, to facilitate communication across multiple clusters. The multiple clusters may represent, for example, multiple and/or all clusters in a data center or other enterprise.

Upgrade management agents described herein accordingly may facilitate complex upgrade scheduling and installation in massively distributed systems. The modules (e.g., plug-ins) described herein which may be provided, for example, in upgrade plug-in repository 130, may include and/or be associated with metadata describing state changes and/or other actions used in an installation of particular upgrades. The modules (e.g., plug-ins) described herein may specify the logic for executing pre-checks, post-checks, and conducting installation of a particular upgrade. In this manner, the detection/update logic used (e.g., to detect components in a computing system and update the components), which may be provided in one or more upgrade management agents described herein, may be separated from the description of state changes in the system and the logic for conducting individual upgrades, which may be provided in the modules (e.g., plug-ins) described herein, and accessed and/or executed by the upgrade management agent when appropriate. Upgrade management agents described herein may in this manner conduct pre-checks of one or more nodes to ensure suitable initial conditions for executing the selected upgrades and post-checks to ensure upgrades have completed as expected as specified by the modules for one or more components being upgraded. In scheduling upgrades, upgrade management agents described herein may resolve multi-dimensional dependencies between different upgrades. In order to resolve these dependencies the upgrade management agent can create a directed acyclic graph (DAG) of inter-dependent upgradable components in some examples. The dependency between components can be expressed in the plug-ins describing the metadata for a particular upgrade. In some examples the dependency can be multi-dimensional e.g., a software component can be dependent on a particular version of another software component, a particular version of hypervisor and/or a particular version of guest OS all at the same time. The upgrade management agent may express this multi-dimensional dependency in a DAG. During an upgrade, upgrade management agents described herein may obtain a topological sort of a DAG describing dependencies for the components involved in the upgrade before grouping the components in their respective groups for state change optimization as described earlier. The topological sort of the DAG may specify, for example, which components may need to be upgraded before other components. The upgrade management agent may group components together for upgrade such that the dependencies are satisfied. In some examples, not all dependencies may be satisfied. The upgrade management agent may group components together and/or time the upgrade of components to satisfy only some dependencies in some examples.

In this manner, examples described herein may upgrade infrastructure components generally across datacenters or other enterprise locations including multiple clusters. Many different types of infrastructure components may be coordinated in the upgrade process—including software components and firmware components. In some examples, the clusters may be upgraded in parallel, while individual nodes in a cluster may be upgraded in a rolling fashion. Upgrades may be performed in initial systems to upgrade an initial system configuration. Upgrades may in some examples be performed in systems having operated for some time and whose configuration (e.g., versions of components, identity of components, etc.) may have changed from a known initial configuration. In some examples, one or more upgrade management agents may identify the components and versions of the components in the system, and accordingly may not utilize a known configuration of those items.

Accordingly, examples of systems described herein may provide for a variety of operations, such as (1) Parallel updates of components across multiple computing clusters Upgrade management agents described herein may update multiple clusters in parallel or in any policy as specified by the users—e.g., all in parallel, canary, brownfield/greenfield etc.

(2) Rolling upgrades of software components across a cluster

Upgrade management agents described herein may facilitate rolling upgrades (e.g., rolling operating system and/or hypervisor upgrades) across a cluster. An operating system module and/or a hypervisor module (e.g., provided in upgrade plug-in repository 130) may specify the actions for an upgrade management to take in order to perform pre-checks, state changes, and post-checks together with the application logic for running the software upgrade. The upgrade management agent may access and utilize this combination of metadata and logic to perform pre-checks, state changes and post-checks and execute the module code to update software components (e.g., operating systems, hypervisors) in a rolling fashion across multiple (e.g., all) nodes in a cluster. In this manner, multiple different operating system vendors and/or hypervisor vendors (e.g., AHV, ESX, HyperV or Xen) may be supported.

Figure 8A:
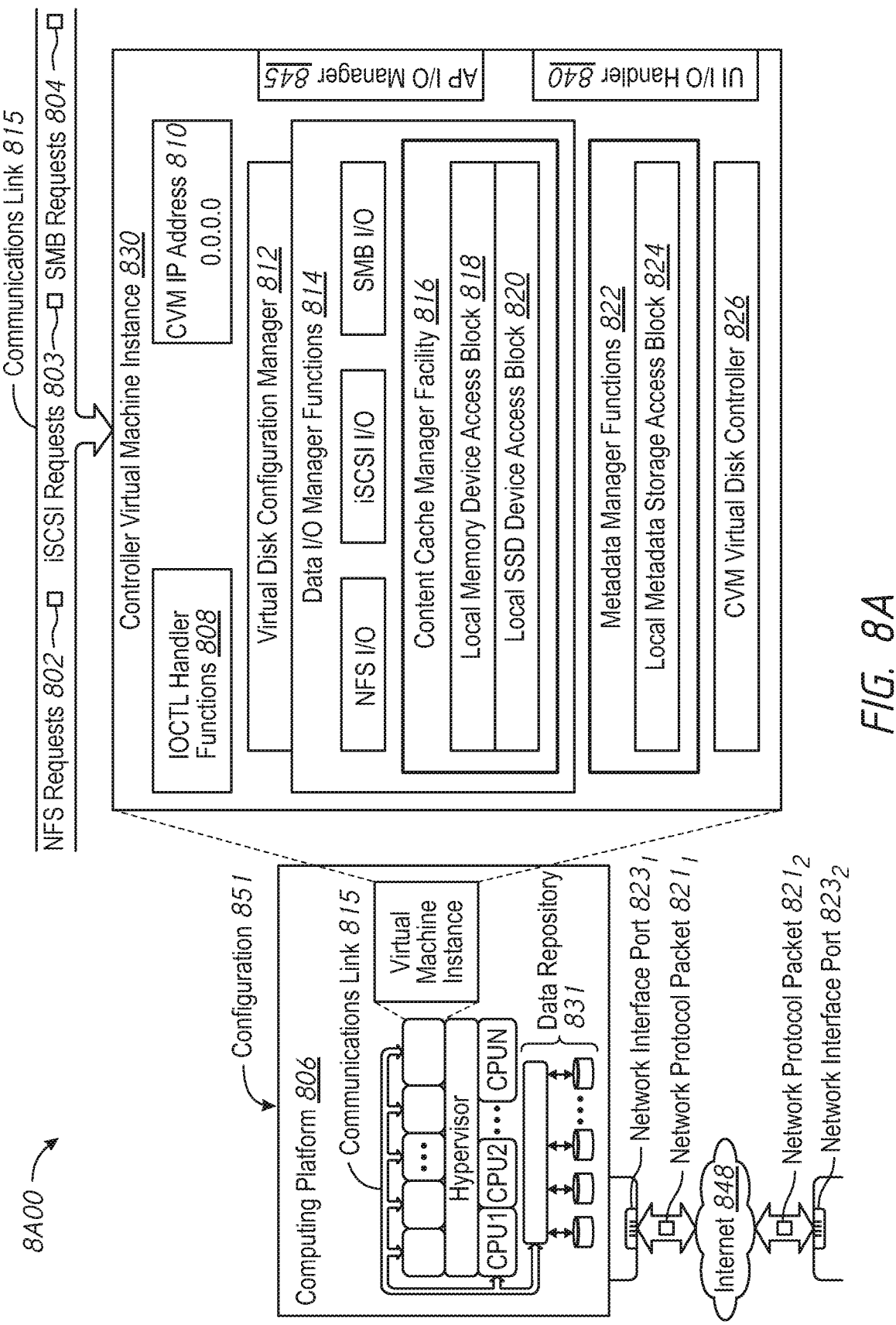
FIG. 8A, FIG. 8B, and FIG. 8C depict virtualized controller architectures comprising collections of interconnected components suitable for implementing embodiments of the present disclosure and/or for use in the herein-described environments.

(4) Rolling upgrades of hardware device firmware for multiple platforms across a cluster In an analogous fashion, and in some examples using abstraction layers described herein, upgrade management agents described herein may update firmware across a variety of hardware platforms (e.g., NX, XC, IHX, software-only) in a rolling fashion across multiple (e.g, all) nodes in a cluster System Architecture Overview
Additional System Architecture Examples FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI 10 handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to managing updates in distributed computing systems. In some embodiments, a module may include one or more state machines and/or combinational logic used to implement or facilitate the operational and/or performance characteristics pertaining to managing updates in distributed computing systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing updates in distributed computing systems). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to managing firmware updates in distributed computing systems, and/or for improving the way data is manipulated when performing computerized operations pertaining to firmware upgrades.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
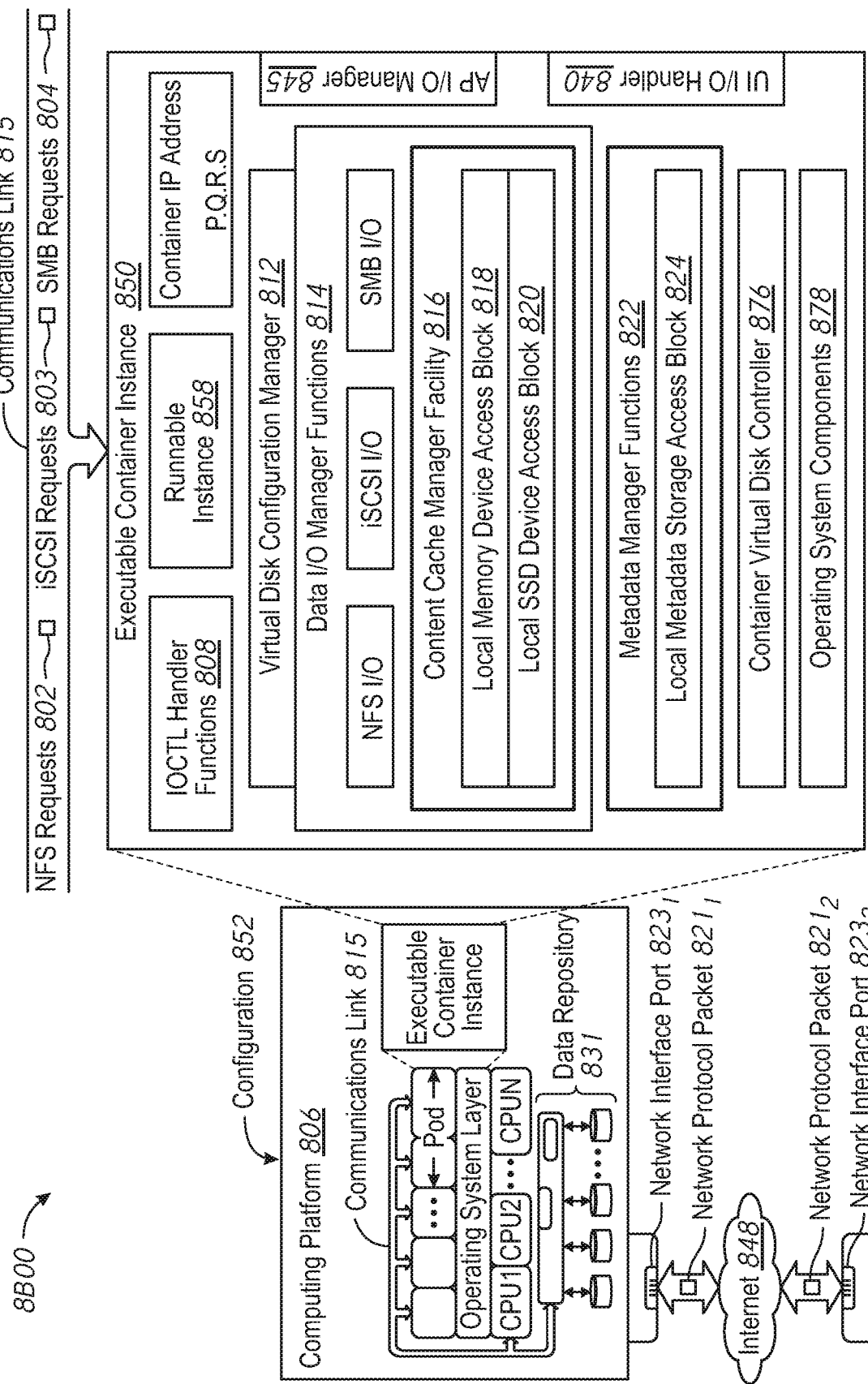

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
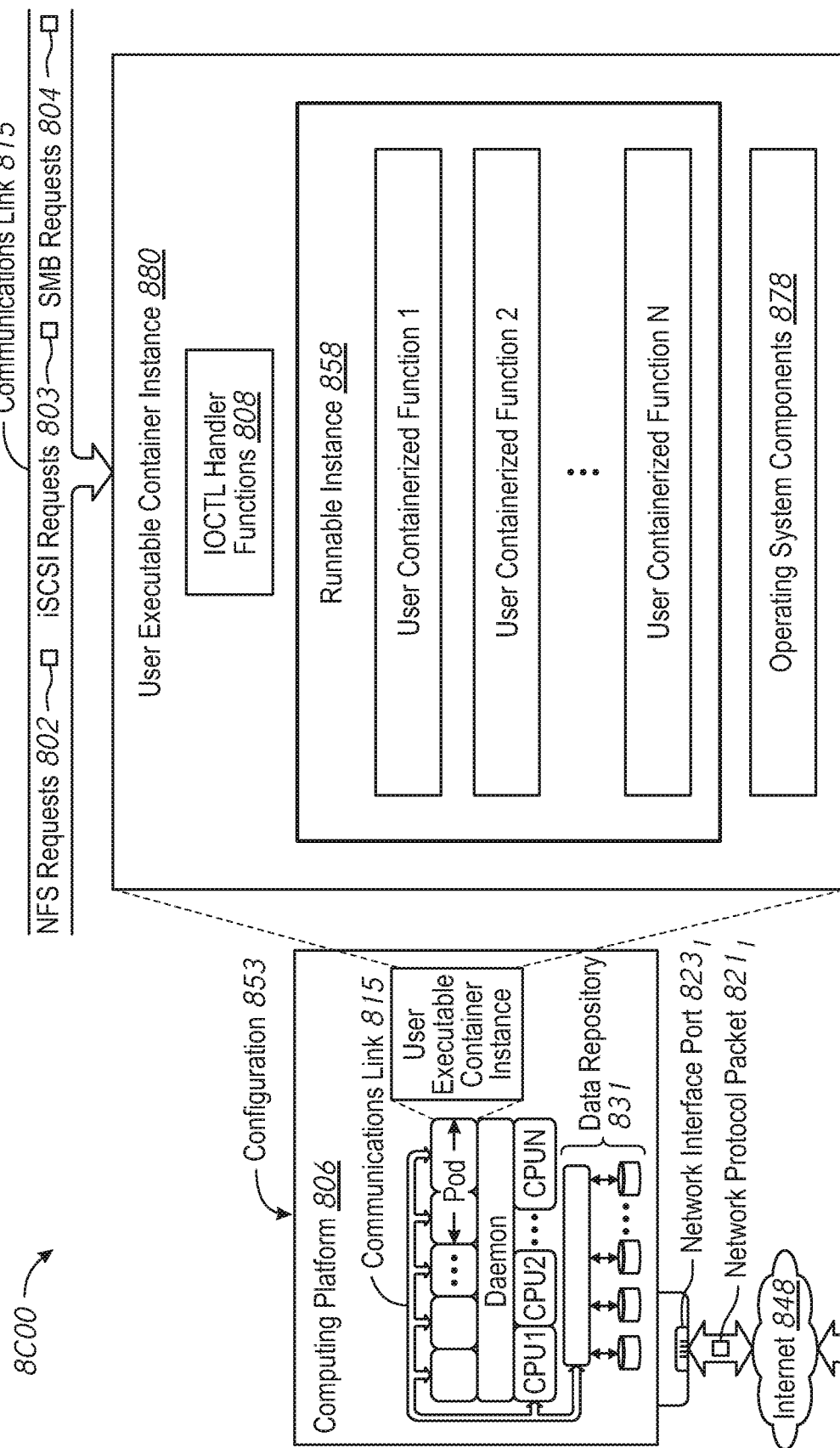

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
    detecting a current version of a first component of a first computing node of a clustered computing system and a current version of a second component of a second computing node of the clustered computing system;
    based on detecting the current version of the first component and the current version of the second component, obtaining an upgrade module for the first component and an upgrade module for the second component;
    generating a time-based sequence of instructions for installation of the upgrade module for the first component and the upgrade module for the second component, including instructions for parallel installation on the first computing node and the second computing node, wherein the time-based sequence of instructions comprise one or more sequential upgrade operations for installation of the upgrade module for the first component and the upgrade module for the second component; and
    installing, in parallel, the upgrade module for the first component on the first computing node and the upgrade module for the second component on the second computing node.

2. The method of claim 1, wherein detecting the current version of the first component, the current version of the second component, or combinations thereof, comprises detecting a current version of a software component, a firmware component, or combinations thereof.

3. The method of claim 1, wherein detecting the current version of the first component, the current version of the second component, or combinations thereof comprises detecting the current version of the first component of the first computing node in a first cluster and detecting the current version of the second component of the second computing node in a second cluster.

4. The method of claim 2, wherein detecting the current version of the firmware component comprises interacting with one or more firmware management plug-ins through an abstraction layer, wherein the abstraction layer translates one or more vendor-agnostic firmware messages to one or more vendor-specific firmware operations of the firmware component.

5. The method of claim 1, wherein generating the time-based sequence of instructions for installation is based on collecting resource usage data for the upgrade module for the first component and the upgrade module for the second component.

6. The method of claim 1, wherein generating the time-based sequence of instructions for installation is further based on collecting state change data used by the upgrade module for the first component and the upgrade module for the second component.

7. The method of claim 1, wherein generating the time-based sequence of instructions for installation is further based on information obtained from a rulebase, wherein the rulebase comprises data records storing attributes to constrain certain upgrade management operations of the clustered computing system.

8. The method of claim 1, wherein generating the time-based sequence of instructions for installation comprises generating an upgrade operation schedule.

9. The method of claim 1, wherein detecting the current version of the first component, the current version of the second component, or combinations thereof comprises detecting a hypervisor, an operating system, or combinations thereof.

10. The method of claim 1, further comprising:
    detecting a current version of a third component of a third node in the first cluster;
    detecting a current version of a fourth component of a fourth node in the first cluster;
    based on detecting the current version of the third component and the current version of the fourth component, obtaining an upgrade module for the third component and an upgrade module for the fourth component;
    generating a time-based sequence of instructions for installation of the upgrade module for the third component and the upgrade module for the fourth component, including instructions for rolling installation on the third computing node and the fourth computing node; and
    installing, in a rolling fashion, the upgrade module for the third component on the third computing node and the upgrade module for the fourth component on the fourth computing node.

11. The method of claim 1, further comprising:
    collecting data indicating a type of state change utilized by the upgrade module for the first component and the upgrade module for the second component; and
    grouping together the parallel installation of the upgrade module for the first component on the first computing node and the upgrade module for the second component on the second computing node based at least in part on the collected data indicating the type of state change.

12. At least one non-transitory computer-readable storage medium including instructions that when executed by a first computing node, cause the first computing node to:
  detect a current version of a first component of the first computing node of a clustered computing system and a current version of a second component of a second computing node of the clustered computer system;
  based on detecting the current version of the first component and the current version of the second component, obtain an upgrade module corresponding to the first component and an upgrade module corresponding to the second component;
  generate a time-based sequence of instructions for installation of the upgrade module corresponding to the first component and the upgrade module corresponding to the second component, including instructions for parallel installation on the first computing node and the second computing node, wherein the time-based sequence of instructions comprise one or more sequential upgrade operations for installation of the upgrade module corresponding to the first component and the upgrade module corresponding to the second component; and
  install, in parallel, the upgrade module corresponding to the first component on the first computing node and the upgrade module corresponding to the second component on second computing node.

13. The at least one non-transitory computer-readable storage medium of claim 12, wherein detecting the current version of the first component, the current version of the second component, or combinations thereof comprises detecting a current version of a software component, a firmware component, or combinations thereof.

14. The at least one non-transitory computer-readable storage medium of claim 12, wherein detecting the current version of the first component, the current version of the second component, or combinations thereof comprises detecting the current version of the first component of the first computing node in a first cluster and detecting the current version of the second component of the second computing node in a second cluster.

15. The at least one non-transitory computer-readable storage medium of claim 13, wherein detecting the current version of the firmware component comprises interacting with one or more firmware management plug-ins through an abstraction layer, wherein the abstraction layer translates one or more vendor-agnostic firmware messages to one or more vendor-specific firmware operations of the firmware component.

16. The at least one non-transitory computer-readable storage medium of claim 12, wherein generating time-based sequence of instructions for installation is based on collecting resource usage data for the upgrade module corresponding to the first component on the first computing node and the upgrade module corresponding to the second component.

17. The at least one non-transitory computer-readable storage medium of claim 12, wherein generating time-based sequence of instructions for installation is further based on collecting state change data used by the upgrade module corresponding to the first component on the first computing node and the upgrade module corresponding to the second component.

18. The at least one non-transitory computer-readable storage medium of claim 12, wherein generating the time-based sequence of instructions for installation is further based on information obtained from a rulebase, wherein the rulebase comprises data records storing attributes to constrain certain upgrade management operations of the clustered computing system.

19. The at least one non-transitory computer-readable storage medium of claim 12, wherein generating the time-based sequence of instructions for installation comprises generating an upgrade operation schedule.

20. The at least one non-transitory computer-readable storage medium of claim 12, wherein detecting the current version of the first component, the current version of the second component, or combinations thereof comprises detecting a hypervisor, an operating system, or combinations thereof.

21. The at least one non-transitory computer-readable storage medium of claim 12, wherein the first computing node is further configured to:
  detect a current version of a third component of a third node in the first cluster;
  detect a current version of a fourth component of a fourth node in the first cluster;
  based on detecting the current version of the third component and the current version of the fourth component, obtain an upgrade module corresponding to the third component and an upgrade module corresponding to the fourth component;
  generate a time-based sequence of instructions for installation of the upgrade module corresponding to the third component and the upgrade module corresponding to the fourth component, including instructions for rolling installation on the third computing node and the fourth computing node; and
  install, in a rolling fashion, the upgrade module corresponding to the third component on the third computing node and the upgrade module corresponding to the fourth component on the fourth computing node.

22. The at least one non-transitory computer-readable storage medium of claim 12, wherein detecting the current version of the first component, the current version of the second component, or combinations thereof comprises detecting an operating system.

23. The at least one non-transitory computer-readable storage medium of claim 12, the instructions further comprising:
  collecting data indicating a type of state change utilized by the upgrade module corresponding to the first component and the upgrade module corresponding to the second component; and
  grouping together the parallel installation of the upgrade module corresponding to the first component and the upgrade module corresponding to the second component based at least in part on the collected data indicating the type of state change.

24. A clustered computing system comprising:
  a storage pool; and
  a first cluster comprising a first computing node and a second cluster comprising a second computing node, the first computing node and the second computing node each configured to access the storage pool, wherein the first computing node is configured to:
    detect a current version of a first component of the first computing node hosted on the clustered computing system and a current version of a second component of the second computing node hosted on the clustered computing system;
    based on detecting the current version of the first component and the current version of the second component, obtain an upgrade module for first component and an upgrade module for the second component;

install, in parallel, the upgrade module for the first component on the first computing node and the upgrade module for the second component on second computing node based at least in part on a time-based sequence of instructions, wherein the time-based sequence of instructions comprises one or more sequential upgrade operations for installation of the upgrade module for the first component and the upgrade module for the second component.

25. The clustered computing system of claim 24, wherein the first computing node is further configured to:

generate the time-based sequence of instructions for installation of the upgrade module for the first component and the upgrade module for the second component, including instructions for parallel installation on the first computing node and the second computing node.

26. The clustered computing system of claim 24, wherein the current version of the first component, the current version of the second component, or combinations thereof comprises a software component, a firmware component, or combinations thereof.

27. The clustered computing system of claim 26, wherein detecting a current version of a firmware component of the plurality of components comprises interacting with one or more firmware management plug-ins through an abstraction layer, wherein the abstraction layer translates one or more vendor-agnostic firmware messages to one or more vendor-specific firmware operations of the firmware component.

28. The clustered computing system of claim 24, wherein generating time-based sequence of instructions for installation is based on collecting resource usage data for the upgrade module for the first component and the upgrade module for the second component.

29. The clustered computing system of claim 24, wherein generating time-based sequence of instructions for installation is further based on collecting a set of state change data used by the upgrade module for the first component and the upgrade module for the second component.

30. The clustered computing system of claim 24, wherein generating time-based sequence of instructions for installation is further based on information obtained from a rulebase, wherein the rulebase comprises data records storing attributes to constrain certain upgrade management operations of the clustered computing system.

31. The clustered computing system of claim 24, wherein the current version of the first component, the current version of the second component, or combinations thereof comprises a hypervisor, an operating system, or combinations thereof.

32. The clustered computing system of claim 24, wherein generating the time-based sequence of instructions for installation comprises generating an upgrade operation schedule.

33. The clustered computing system of claim 24, wherein the first computing node is further configured to:

detect a current version of a third component of a third node in the first cluster;

detect a current version of a fourth component of a fourth node in the first cluster;

based on detecting the current version of the third component and the current version of the fourth component, obtain an upgrade module for the third component and an upgrade module for the fourth component;

generate a time-based sequence of instructions for installation of the upgrade module for the third component and the upgrade module for the fourth component, including instructions for rolling installation on the third computing node and the fourth computing node; and install, in a rolling fashion, the upgrade module for the third component on the third computing node and the upgrade module for the fourth component on the fourth computing node.

34. The clustered computing system of claim 24, wherein the first computing node is further configured to:

collect data indicating a type of state change utilized by the upgrade module for the first component on the first computing node and the upgrade module for the second component on second computing node; and group together the parallel installation of the upgrade module for the first component on the first computing node and the upgrade module for the second component on second computing node based at least in part on the collected data indicating the type of state change.

* * * * *

UNITED STATES PATENT AND TRADEMARK OFFICE
CERTIFICATE OF CORRECTION

PATENT NO. : 11,144,306 B2
APPLICATION NO. : 16/864512
DATED : October 12, 2021
INVENTOR(S) : Jan Olderdissen et al.

Page 1 of 1

It is certified that error appears in the above-identified patent and that said Letters Patent is hereby corrected as shown below:

In the Specification

|  | Reads | Should Read |
|---|---|---|
| Column 29, Line 35 | "IHX" | -- HX -- |

Signed and Sealed this
Twenty-first Day of December, 2021

Drew Hirshfeld
*Performing the Functions and Duties of the
Under Secretary of Commerce for Intellectual Property and
Director of the United States Patent and Trademark Office*